United States Patent
Hu et al.

(10) Patent No.: US 6,832,542 B2
(45) Date of Patent: Dec. 21, 2004

(54) METHOD AND DEVICE FOR PREPARING A HOT BEVERAGE

(75) Inventors: Ruguo Hu, New Milford, CT (US); Corey Arrick, New Milford, CT (US); Eugene Scoville, New Milford, CT (US); John Bernardi, New Milford, CT (US); Brita Frangsmyr Sheehan, New Milford, CT (US); William F. Overbaugh, Lakeside, CT (US); Ennio Bardin, Orbe (CH); Randall C. Chrisman, Southbury, CT (US)

(73) Assignee: Nestec S.A., Vevey (CH)

( * ) Notice: Subject to any disclaimer, the term of this patent is extended or adjusted under 35 U.S.C. 154(b) by 29 days.

(21) Appl. No.: 10/247,377

(22) Filed: Sep. 20, 2002

(65) Prior Publication Data

US 2003/0056661 A1 Mar. 27, 2003

Related U.S. Application Data

(63) Continuation-in-part of application No. PCT/EP02/02782, filed on Mar. 12, 2002.
(60) Provisional application No. 60/278,482, filed on Mar. 23, 2001.

(51) Int. Cl.[7] ............................. A47J 31/32; A47J 31/24
(52) U.S. Cl. ...................... 99/302 R; 99/295; 99/323.1
(58) Field of Search ............................... 99/296, 302 R, 99/307, 323.1, 300

(56) References Cited

U.S. PATENT DOCUMENTS

| | | | | |
|---|---|---|---|---|
| 5,826,492 A | * | 10/1998 | Fond et al. | 99/295 |
| 5,897,899 A | * | 4/1999 | Fond | 426/112 |
| 5,913,962 A | * | 6/1999 | Gasser et al. | 99/293 |
| 6,021,705 A | * | 2/2000 | Dijs | 99/295 |
| 6,142,063 A | * | 11/2000 | Beaulieu et al. | 99/283 |

* cited by examiner

Primary Examiner—Reginald L. Alexander
(74) Attorney, Agent, or Firm—Winston & Strawn LLP

(57) ABSTRACT

The invention relates to a capsule for the preparation of a beverage obtained by supplying hot water within the capsule under pressure and releasing the beverage from the capsule; said capsule comprising a food substance therein, a first surface adapted to be traversed by a flow of water entering the capsule, a second surface adapted to be traversed by a flow of beverage exiting the capsule, wherein the second surface is adapted to deform outwardly upon action of the inside water pressure thereon and wherein said surface comprises at least one opening member capable of deforming inwards the capsule upon a mechanical reaction force applied from outside onto the closure member as a result of the deformation of said second surface due to the build-up of the inside pressure.

37 Claims, 11 Drawing Sheets

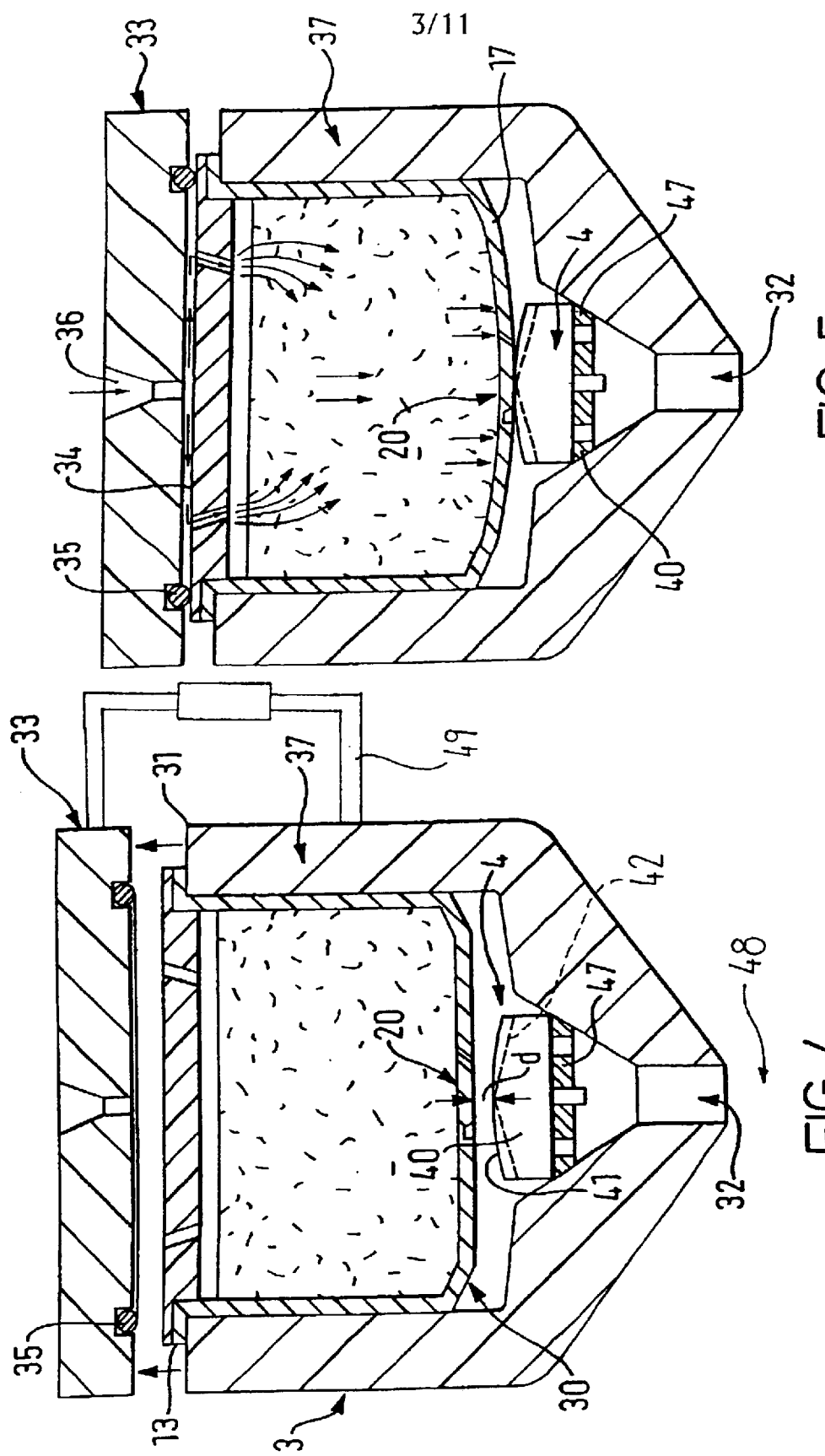

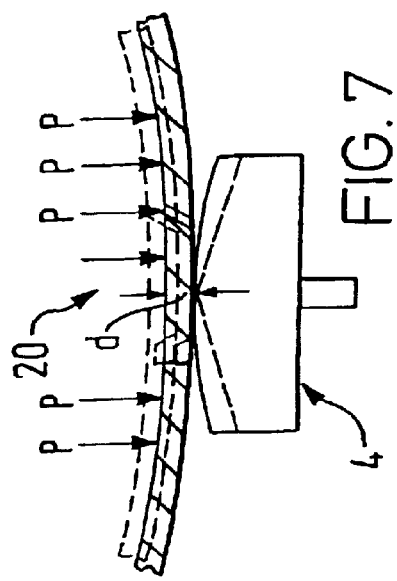
FIG. 7
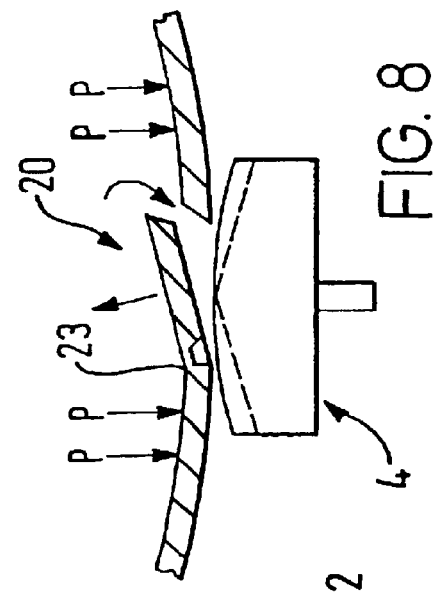
FIG. 8
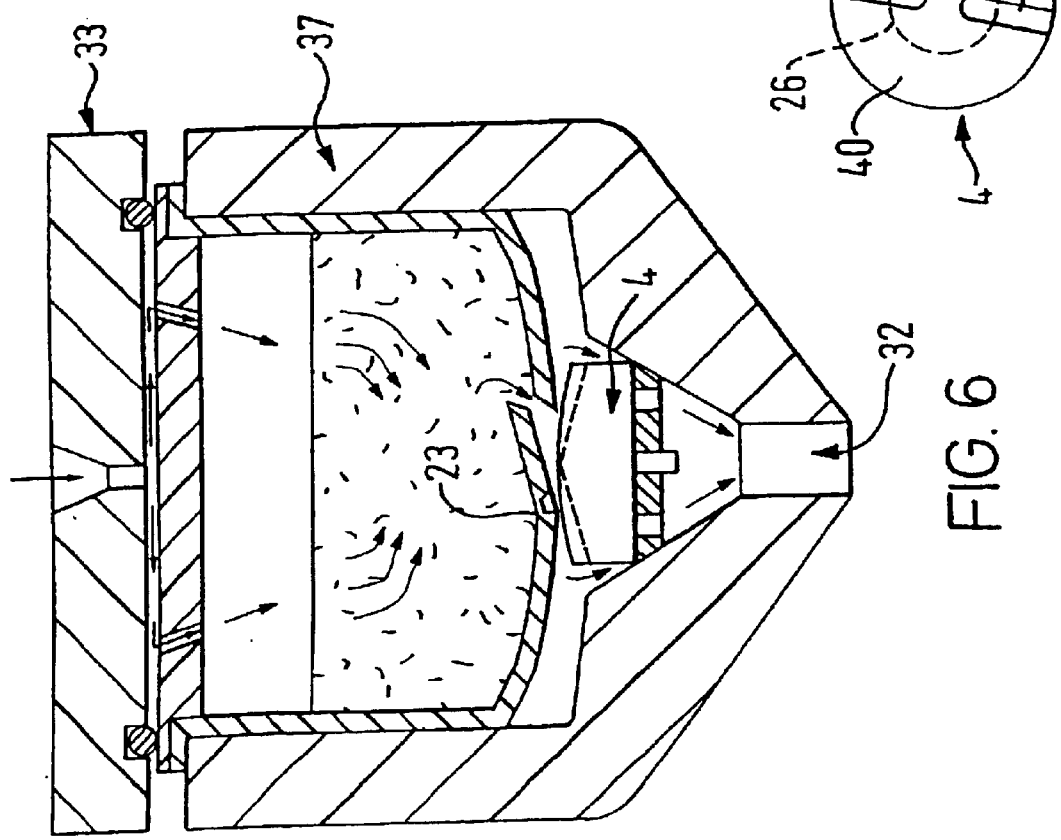
FIG. 8A
FIG. 6

METHOD AND DEVICE FOR PREPARING A HOT BEVERAGE

CROSS-REFERENCE TO RELATED APPLICATIONS

The present application is a continuation-in-part of the U.S. national stage designation of International Application PCT/EP02/02782, filed Mar. 12, 2002, which claims the benefit of U.S. Provisional Application No. 60/278,482, filed Mar. 23, 2001, the content of which applications is expressly incorporated herein by reference thereto.

FIELD OF THE INVENTION

The present invention relates to the preparation of a beverage from a capsule containing a dry food substance. More particularly, the invention relates to a capsule adapted for the preparation of a foamy beverage using hot water under pressure passing through the capsule. The invention also relates to a method for the preparation of a foamy beverage using such a capsule. The invention also relates to a beverage preparation device adapted to receive such a capsule for preparing a foamy beverage.

BACKGROUND OF THE INVENTION

Foamed beverages such as espresso, cappuccino and latte prepared from a single serve capsule are becoming more and more popular. The principle of using pre-metered and pre-packed portions of coffee or the like for the preparation of coffee or other beverages has already existed for a long time. It has the advantage that it facilitates the preparation of coffee while ensuring that the quality of the product remains relatively consistent. It also provides more convenience for the operator. The capsule usually sits in a leak-tight enclosure of a coffee-type machine and hot water is passed through the capsule under pressure. The use of roast-and-ground powder is widely utilized commercially in capsules that perforate under the build-up of pressure to release the extracted liquid. However, to date, there do not exist any systems of capsules adapted for soluble powder that would confer a sufficient level of quality and foam able to compete with the roast-and-ground segment on the market. Therefore, all the attempts for such soluble powder containing capsules have not met with commercial success to date.

A problem commonly met with the existing capsules comes from the fact that the pressure cannot build up sufficiently well to have the powder entirely and homogeneously mixed with water. Channeling problems are usually noticed within the powder cake causing primary paths for water and zones which are not properly wetted by water. Therefore, the capsule can usually not be fully emptied or washed causing inconsistent dosage and powder waste left within the capsule. Other common problems met with the existing capsules relate to the generation of a poor foam or even no foam at all thereby producing beverages such as cappuccino or latte of very poor quality. As a result, these poor quality beverages get very little consumer acceptance.

Those problems are dependent upon the way the pressure builds up inside the capsule and the way the beverage is released into the cup. The building-up of the pressure and release are steps to ensure a product of satisfactory quality as well as to ensure a correct emptying or washing of the product inside the capsule.

Another problem results from the intensive mechanical interactions between the capsule and the means that exert pressure onto the capsule to effect the release of the beverage. Usually, the capsule is perforated by perforated means such as a corrugated or cutting surface or an opening element forcing a passage through the bottom of the capsule and positioning within the capsule. Such interactions have a tendency to generate bits of material from the capsule, such as plastic bits and the like, which may contaminate the beverage.

Foamed beverages such as espresso, cappuccino and latte prepared from dispensing machines are becoming more and more popular. Methods of preparation of such products from a predosed capsule are also known. The principle of using pre-metered and pre-packed portions of coffee and the like for the preparation of coffee-based beverages has the advantages to facilitate the preparation of the beverage while ensuring that the dose-to-dose quality and strength of the beverage remains constant for the same conditions of preparations (dosage, temperature, pressure, time, etc.). It also provides more convenience to the user. The capsule usually sits in a leak-tight enclosure of a special coffee-type machine and hot water is passed through the capsule under pressure. The underside of the capsule perforates under the build-up of pressure to release the extracted liquid. The use of roast-and-ground powder in capsules is commercialized to make coffee cups of high quality.

EP 0 512470 B1 describes a process for extracting sealed cartridges in a cartridge holder in which a mixture of water and air is injected into the cartridge under a pressure of 1 to 20 bar to deform the extraction face. The extraction face of the cartridge is deformed against a relief surface of the cartridge holder comprising relief elements and recessed elements, the extraction face tearing at the location of these relief elements and/or these recessed elements on reaching the breaking stress to enable liquid to be subsequently removed after extraction of the coffee under a pressure of 1 to 20 bar.

This process proves to be very effective for extracting a beverage liquid from an extractable, non-soluble material such as roast and ground coffee. Since the product is not soluble within the cartridge, the bed of material maintains an elevated inside resistance and pressure tends to build up to a relatively high range as more water enters the cartridge. The combination of high pressure, temperature and extraction time is key for extracting the fine aroma compounds from the coffee bed until the extraction face can tear to allow release of the extracted liquid in the cup.

For soluble products, water does not serve to extract solids and coffee aroma compounds but it is supposed to solubilize all the solids. Dilution of the solids is essentially obtained by thorough mixing within the capsule during a sufficient time up to a complete dilution. Furthermore, mixing should be carried out while entrapping sufficient air to form a good foam or froth upon releasing in the cup. Foam generation of soluble powder is complex and may also be dependent on the physical release conditions of the solution through the capsule. These physical conditions involve the level of shear created and pressure release through the openings. The building-up of pressure and the timing for release are also selected to obtain a sufficient mixing and air entrapment in the solution. The problem is that, when liquid starts entering the capsule, the powder starts dissolving and the solution tends to evacuate. As solids content in the capsule decreases, the resistance created by the powder in the capsule decreases proportionally. As a result, the solution tends to evacuate too quickly the capsule and at a too low pressure, without sufficient mixing having been carried out. As mixing is insufficient, lumps may form in the delivered solution, insufficient amount of air is entrapped and the resulting amount of foam created is poor.

U.S. Pat. No. 3,292,527 to Stasse relates to an apparatus and a cartridge adapted to deliver in succession different drinks or beverages without allowing the drink or beverage to contact the basic elements of the apparatus. The cartridge may contain fine soluble powder and has a perforated bottom side that creates a pressure drop capable of retarding the outflow through the orifice. Such a perforated arrangement by itself, even when small, does not produce sufficient shear and does not retain sufficient pressure inside to be capable of generating a properly whipped or foamed beverage.

EP 0 468 080 to Fond also relates to a process of extraction of a cartridge for roast and ground coffee wherein the cartridge has an apertured bottom side to deliver the extracted liquid along an extensive surface. This process is for roast-and-ground but would not properly apply to soluble powder such as instant coffee powder for the same reasons as for U.S. Pat. No. 3,292,527.

WO 01/58786 to Halliday relates to a cartridge for the preparation of whipped beverages of "espresso" type in machines operating at low pressure characterized in that the cartridge incorporates in the beverage flow path, prior to or at the outlet, means for producing a jet of beverage, at least one inlet for air and means to generate a pressure reduction of the jet of beverage whereby in use air from the air inlet is incorporated into the beverage as a plurality of small bubbles. Due to the low pressure inside the cartridge, air must be added by specific air inlets. Such a cartridge specifically involves many parts and, hence, is tricky, complex and expensive to produce.

A need exists for a system to produce a food liquid, such as a coffee-based product, having superior whipped or foam characteristics obtained from a capsule-type system, and for the system to employ a relatively simple and low cost cartridge that can generate a substantially complete dissolution of the soluble food product and a high amount of foam.

SUMMARY OF THE INVENTION

The present invention provides a new type of capsule, which enables inside pressure building-up at a level required for a proper powder reconstitution or dissolution when producing the beverage. The invention also provides a capsule capable of providing a beverage having an improved quality of foam resulting from the control of the release of the pressure built in the capsule before dispensing the beverage into the cup. Additionally, an inventive capsule reduces the severe mechanical interactions during the opening of the capsule for dispensing of the beverage thereby reducing the risks of producing bits of material such as small plastic pieces which could inadvertently mix with the beverage into the cup.

For this, the invention relates to a capsule for the preparation of a beverage obtained by supplying hot water within the capsule under pressure and releasing the beverage from the capsule; said capsule comprising a food substance therein, a first surface adapted to be traversed by a flow of water entering the capsule, a second surface adapted to be traversed by a flow of beverage exiting the capsule, wherein the second surface is adapted to deform outwardly upon action of the inside water pressure thereon and wherein said surface comprises at least one openable member capable of deforming inwards the capsule upon a mechanical reaction force applied from outside onto the openable member, such as by a opening member or force generating member as a result of the deformation of the second surface due to the build-up of inside pressure deforming said second surface.

As a result of this, both the build-up of pressure inside the capsule and the release can be better controlled thereby providing an improvement of the quality of the beverage; i.e., a full powder reconstitution/dissolution with no waste inside and generation of good looking foam upon release of the pressure.

Preferably, the openable member comprises a continuous precut line cutting through the thickness of the second surface and further comprises a resilient folding portion whereby the folding portion is adapted to cause the openable member to fold upon action of said reaction force applied from outside onto the closure to effect release of the beverage. The folding portion may preferably be a single foldable portion arranged so that the openable member is capable of moving inwardly with respect to the rest of the second surface by folding along the foldable portion. Therefore, in addition to the advantages previously mentioned, such configuration induces less mechanical interactions as there is neither puncturing nor cutting on the capsule. As a result, there are no risks of having bits of material from the capsule contaminating the beverage at the time the beverage is dispensed through the outlet to the cup.

In a preferred embodiment, the precut line is arranged so that the openable member forms a valve that closes upon the build-up of pressure caused by the addition of water inside the capsule till at least a certain pressure level. The valve configuration reinforces the strength of the openable member to the building-up of the inside pressure build-up thereby allowing a sufficient level of pressure to install within the capsule and consequently delaying the release of the beverage. Therefore, it is made possible to control to an appropriate level of pressure inside the capsule which is used for reconstituting, such as preferably by dissolution, the beverage before the beverage is released. As preferred embodiments, the precut line may be beveled or, alternatively, be stepped. In a more general manner, the valve comprises at least one positive edge of the openable member that is capable of holding on a complementarily shaped edge of the opening as a response to the inside pressure thereby causing the closure of the openable member.

In a preferred embodiment, the foldable portion is of a transversal dimension lower than the peripheral dimension of the precut line. Therefore, the folding of the openable member is facilitated while lowering the risks of rupture or breakage of small bits of capsules.

Still preferably, the precut line has a width of from 0.05 to 0.3 mm, preferably of from 0.1 to 0.2 mm. Such dimension is suitable for providing a sufficient build-up of the inside pressure while allowing the capsule to deform outwardly until a reaction force can act to release the pressure for providing a high quality and foamy beverage. As defined, the width is also determined with respect to the usual powder size suitable for a proper beverage reconstitution so that no significant amount of powder can inadvertently exit the capsule when the capsule is stored before use.

In another aspect, the invention relates to a method for preparing a hot beverage using a capsule as previously mentioned comprising the step of providing such capsule, providing hot water entering the first surface and mixing the food substance with the water and build-up a pressure inside the capsule to prepare a beverage; providing a reaction force member for generating a reaction force from outside of the capsule and opening the second surface by applying said reaction force onto the openable member as a result of the building-up of inside pressure deforming said second surface.

Preferably, the reaction force member and openable member are spaced by a gap before the pressure builds up in the capsule. The gap is determined to take into account the level of pressure desired inside the capsule that translates into a deformation of the capsule; i.e., of the second surface, which closes the gap and effect opening of the capsule. Therefore, the opening member, reaction force generating member is adapted to interact with the capsule until a certain inside pressure has been created within the capsule thereby ensuring a controlled building-up of the inside pressure and a delaying of the release of pressure at the required level for improving the dissolution and the quality of foam of the resulting product. In such configuration, the capsule comprises valve as previously defined so as to resist to the increase of the inside pressure caused by the water entering the capsule.

More preferably, the opening of the capsule may be effected by build-up of pressure inside the capsule at a level sufficient to cause the second surface to deform outwards and the openable member becomes contacted by the reaction force generating member thereby causing the opening portion to resiliently deform inwardly and consequently effecting the release of the beverage. The opening of the capsule may thus be effected automatically in a very precise and reproducible manner as the capsule "inflates" until the opening of the capsule is actuated by the reaction force generating member. Therefore, the reaction force generating member may preferably be spaced by a predetermined gap from the openable member and be positioned in a fixed position with respect to openable member; such predetermined gap corresponding to the required level of pressure desired for the intended beverage.

In another aspect the invention relates to an apparatus for preparing a beverage adapted to receive a capsule as defined previously, said apparatus comprising:

(i) a housing arranged for lodging the capsule in a substantially fixed position whereas allowing at least the second surface to deform outwardly upon the action of inside pressure build-up and, (ii) a reaction force generating member adapted to hold on the openable member and to cause the openable member to move inwardly so as to effect release of the beverage as a result of the pressurization of the capsule with water.

Preferably, the reaction force generating member comprises a pressure surface adapted to hold against the openable member of the capsule as a response of the increase of inside pressure; said surface being larger than the openable member so as to effect the opening according to a limited range of angulation possible. This allows a release of relatively high pressure suitable for the formation of an appealing foam. This also allows for a gentler opening of the capsule with lower mechanical stress and consequently reduced risks of contamination by loose bits from the capsule. More preferably, the pressure surface is bulged to limit the size of the opening of the capsule. Such limitation of the size of the opening permits to better control the pressure release for a better foam but also reduces the stress on the openable member.

The release of the beverage may also be better ensured if one provides channels extending along or through the pressure surface of the reaction force generating member thereby guiding the foam and liquid toward the dispensing outlet. The size and shape of those channels can be optimized to improve the generation of foam, as well, as to regulate the evacuation of liquid flow.

The present invention satisfies these needs. The invention relates to a device for preparing a foamy liquid food from a capsule containing a premetered dose of food soluble substance or "predosed" capsule. The capsule intended for the device has an entry side adapted to be traversed by a flow of water entering the capsule, and a discharge side adapted to be traversed by a flow of beverage exiting the capsule. The device comprises water supply to provide water within the capsule. Water is provided through the entry side, mixes with the soluble substance in the capsule and a beverage is delivered through the discharge side. A beverage and foam conditioner is adapted to open the capsule for release of the beverage and to engage against the discharge side to hold pressure within the capsule so that the soluble substance can thoroughly mix with water and entrap gas within the capsule to dispense a foamy beverage.

Therefore, complete dissolution and foam generation assisted by an engagement member capable of holding pressure inside the capsule and controlling release of the beverage. The system of the invention holds the beverage within the capsule until thorough mixing is obtained and sufficient gas is entrapped in the mixture to prevent release of the partially dissolved substance too early for complete dissolution. For physically achieving such an effect, the liquid and foam conditioner comprises at least one engaging surface adapted to create a tight surface contact with a certain area of the discharge surface of the capsule. As a result, a sufficiently retarded discharge of the beverage through the discharge side is created that benefits complete dissolution and the generation of foam.

The engaging surface is preferably of a convex shape adapted to conform to the surface area of the discharge surface by providing a tight fit between the engaging surface and the surface area of the discharge side. A tight fit ensures a flow resistance so that a pressure can be reached and maintained inside the capsule.

Preferably, the convex shape is adapted to form an inward deformation along a surface area of the discharge side. As resulting from such a deformation, the contact between the engaging surface and the discharge side is improved and made even tighter so that product within the capsule can be held until to achieve a better mixing up to complete dissolution and an effective gas entrapment. Due to the relatively high internal pressure created in the capsule, gas may be entrapped both in dissolved form as a liquid and in gas form, such as in small bubbles.

Preferably, the engaging surface is adapted to engage the discharge side along the surface area without creating substantial tearing between said engaged surface area of the discharge side of the capsule and the engaging surface of the device. The benefit of no substantial tearing by the engaging surface, particularly outside of the area immediately around the opening member, resides in that sufficient contact can be maintained between the discharge surface and the engaging surface to be able to properly retard release of the beverage. Therefore, the engaging surface has preferably a bulged profile as opposed to a sharp profile to avoid tearing of the discharge side. The profile may preferably be a bulged surface of dome-shape, preferably of an angle from 5 to 45 degrees as measured from the tangential to the base of the dome or to the plane perpendicular to the axis of the capsule. The engaging surface should engage along a sufficiently large area of the discharge side to properly control release of the beverage without risking to accidentally tear the capsule which would cause release of the beverage in an uncontrolled manner. Preferably, the engaging surface is adapted to deform a surface area of at least 30% of the whole discharge side of the capsule, even more preferably of from 50 to 90% of it.

In order to better control release of the opening member, it is preferred that an opening member of the device is provided that is distinct from the engaging surface. The opening member engages the discharge side of the capsule to form an opening in the capsule capable of releasing the beverage out of the capsule. The opening member function is thus performed separately from the pressure holding function to ensure a more accurate control of the release. Therefore, the contact surface can be made extensive to properly hold the product inside the capsule while the discharge opening can be limited in size. An opening of limited size promotes shearing of the flow traversing the opening which, in consequence, contributes to generate a better foam in the cup.

In a first embodiment, the opening member comprises a puncturing member adapted to puncture a hole in the discharge side of the capsule. The puncturing member may be at least one cutting edge, a pin, or other member that perforates the material of the discharge side in a precise location point. Several puncture points may be envisaged but one seems to be enough according to the results of numerous tests carried out so far.

In an alternative, the device may also adapt to open a precut capsule. For that the opening member may comprise a finger adapted to open a capsule with a precut gate and wherein the finger is adapted to force opening of a precut gate of the capsule.

The capsule is preferably received in a capsule holder of a cup-shape that comprises the engaging surface and the opening member in its inner bottom side.

In a preferred embodiment, the engaging surface of the liquid and foam conditioner is disposed around the opening member. As a result, the outflow coming out of the opening in the capsule is restricted to some extent by the engaging surface that surrounds the opening. The restrictions created also participate more efficiently to hold the product longer in the capsule and generate additional shear stress on the beverage flow coming out of the opening.

A better control of the release and more shear stress can be performed when the engaging surface of the liquid and foam conditioner has a restricted passage for the liquid mixture. The restricted passage may preferably be channels, corrugations provided onto the engaging surface, or be obtained by a relatively high intrinsic roughness of the engaging surface, or combinations thereof.

A reservoir may also preferably be positioned in recess of the surface engagement member at the exit of the opening. The reservoir creates a separation between the opening member and the engaging surface. It also provides some clearance for the liquid to properly exit the capsule and air to enter the capsule. Its function is to form a buffer chamber for the liquid and to prevent cut fragments of foil of the capsule to block the restricted passages (i.e., channels, corrugations, etc.). The opening member preferably protrudes from the bottom of the reservoir such that the opening is carried out as the capsule deforms along the engaging surface and within the reservoir.

Water can be sullied to the inside of the capsule by piercing the entry side with at least one needle-like water injector. The water injector may have any suitable shape. The water injector may preferably have a piercing tip with water holders forming a certain positive inclination with the longitudinal axis of the injector to direct one or several flows of water in outward direction that promotes turbulence within the capsule. In an alternative way, for pre-opened capsules, water may also be supplied or injected through the discharge side without injectors being necessary but through simple water lines properly coupled to the pre-openings of the entry side of the capsule. The entry side may be the top side of the capsule or, alternatively, or in addition, may be the sidewall of the capsule. Therefore, water can be injected from different off-centered locations, e.g., the top side and/or sidewall, which cause vortex inside the capsule to enhance the powder mixing with water and gas.

The device of the invention comprises a holder for holding the capsule in a tight sealed manner to be able to carry out the preparation of the beverage within the capsule in a clean, fluid-tight sealing and pressurized way. The holder preferably comprises a removable lower holder member of cup shape that engages an upper supply water assembly adapted to cover the capsule. The lower holder member and upper water supply assembly together with a sealing member form a fluid-tight enclosure upon closing around the capsule. The lower holder and the upper seat member have complementary connections that enable to create a tight compressing sealing connection around the capsule. The connections may be of a ramp or bayonet type or any other suitable types.

A preferred method for preparing a foamy liquid food comprises:
  providing and retaining a capsule containing a dose of food soluble substance, wherein the capsule has an entry side adapted to be traversed by a flow of water entering the capsule, a discharge side adapted to be traversed by a flow of beverage exiting the capsule,
  supplying water through the entry side within the capsule and mixing water with the food substance within the capsule,
  releasing the beverage while engaging a surface against the discharge side to hold sufficient pressure within the capsule so that the soluble substance can thoroughly mix with water and entrap gas within the capsule and,
  dispensing a foamy beverage.

In a preferred aspect of the method, engaging a surface against the discharge side is made by inwardly engaging a portion of the discharge side with an engaging surface, preferably a bulged surface, to create a tight contact without tearing of the discharge side as resulting from such a tight contact. Even more preferably, the bulged surface causes a deformation without tearing of the engaged portion of the discharge side of the capsule.

Preferably, beverage is dispensed by passing through the opening of the discharge side of the capsule, then, restrictions provided in the engaging surface and/or on the portion of the discharge side of the capsule in contact with the engaging surface. The restrictions are provided for controlling the release of beverage through the engaging surface, creating shearing and promoting foam generation. The restrictions may be channels, corrugations and the like.

Preferably, the opening of the capsule is made by puncturing in the discharge side of the capsule. In an alternative, the opening is made by a finger that pushes inward a precut member of the discharge side sufficiently to allow the beverage coming out of the capsule. Opening of the discharge side is carried out by at least one opening member that is distinct from the engaging surface that creates tight contact.

In another aspect, the invention relates to a predosed capsule adapted for the preparation of a foamy beverage according to the aforementioned method wherein, it contains a food soluble substance and comprises an entry side adapted to be traversed by a flow of water entering the capsule, a discharge side adapted to be traversed by a flow of beverage exiting the capsule wherein the discharge side is adapted to be opened by an opening member and to resist contact with the engaging surface to create a tight fit with the engaging contact to hold pressure within the capsule sufficiently and control release of a foamy beverage.

The capsule of the invention may be formed of a discharge side which has a plain wall adapted for puncture by a puncturing member of the dispenser to release the beverage. Such a capsule may be a fully closed capsule made of puncturable metallic or plastic material.

In an alternative, the capsule comprises a discharge side wherein at least one opening member is provided to open by a finger of the dispenser. Hence, the openable member may have a precut to ease the opening by the finger. Preferably, the openable member has at least one precut line. Preferably, the openable member comprises a plurality of precut lines arranged to form a pattern with solid regions against two adjacent precut lines. The finger preferably does not open widely the openable member but just holds the openable member in an open configuration, such as by pressing on inwardly on the openable member, with the openable member remaining attached to the discharge side by at least two slightly spaced apart solid regions. As a result, this enables to create just small passages for the beverage to release and a higher degree of shear stress is promoted.

In yet another embodiment, the capsule is pre-opened. The discharge side has at least two separate contiguous layers, each one having at least one passage for the beverage. The passage of one layer being spaced apart from the passage of the other layer. In such configuration, there is no need for a specific opening member of the device and, hence, product cross-contamination is reduced. These two layers may be sealed along the outer edge of the capsule. The offset passages and interface between the layers form a tortuous path for the beverage that both participate to the pressure building up inside the capsule when the engaging surface of the device contacts the discharge side and allow release of the beverage by providing shear stress at the interface of the two layers. Channels or other restriction could be added at the interface of the two layers, i.e., at least in the thickness of one of the layers, to promote shear stress and control pressure inside the capsule.

The discharge side can be made of a flexible and tear resistant material that withstands deformation without tearing upon contacting the engaging surface of the beverage and foam conditioner of the device. Preferred materials for the discharge side is aluminum or aluminum alloy or a laminate of plastic and aluminum, or even full plastic. The thickness of the discharge side may vary as a function of the material or laminate. For an aluminum based material, the thickness is preferably of from 5 to 100 microns, even more preferably of from 15 to 75 microns.

The capsule of the invention is conceived to serve as a mixing bowl for the powder to reconstitute a liquid beverage by thorough mixing with a diluent, preferably water or eventually milk, while entrapping sufficient gas that upon release at normal atmosphere generates multiple fine bubbles that confers an enhanced head of foam in the cup. For that, the enclosure of the capsule should be sized to address the powder capacity issue, as well as the gas capacity issue. An overall volume of the capsule's enclosure of from 20 to 100 cm3, and 25 to 45 cm3 is preferred. The capsule should already contain a suitable amount of gas, such as air, O2, CO2, N2 or any other inert gas or combinations thereof. Preferably, the ratio powder volume to gas volume ranges of from 1:50 to 1:1. Preferably, for coffee powder, the ratio powder volume to gas volume is preferably comprised of from 1:50 to 1:5, even more preferably 1:30 to 1:10. For soluble high load powder including milk powder such as chocolate and cappuccino (also soup), the ratio powder volume to gas volume is preferably of from 1:2 to 4:1. More headspace, i.e., a lower powder air volume, allows better initial powder dissolution especially for powders with lower solubility and/or generate viscous mass after it is mixed with water. With other types of food products, such as capsules with roast and ground coffee, where much of the content of the capsule is not dissolved upon the production of a beverage or other food product, the ratio of powder to gas volume can be above 5:! or even 10:1.

In a preferred construction for the capsule, the capsule comprises a cup member that constitutes the entry side and sidewall of the capsule and a lid that constitutes the discharge side of the capsule. The cup member comprises a peripheral edge that extend outward the sidewall to form a connection surface for the lid constituting the discharge side. Connection of the lid along the edges can be carried out by any suitable pressure resistant structure such as an adhesion, a welding, a crimping, or a combinations thereof. The general shape of the capsule or cup member can take any suitable shape, such as frustoconical, cylindrical, pyramidal, cubic, etc.

Preferably, the outer surface of the discharge side has a passage oriented to control release of the liquid between the discharge side and the engaging surface.

The present invention allows the preparation of a liquid food from a capsule containing dry food substance. A method is provided for preparing a foamy liquid food such as a hot beverage with an enhanced head of foam that is obtained from mixing a diluent with soluble powder within a predosed capsule.

One embodiment of the invention is a system for preparing a liquid food. In the system, a containment portion is configured for containing a food ingredient and for receiving a liquid supplied to flow through in contact with the food ingredient to produce a liquid-food mixture. A boundary wall has a wall surface extending along a peripheral portion of the containment portion. Also, at least one elongated channel extends along the wall surface and disposed downstream of the containment portion for receiving the liquid mixture and directing the liquid mixture to an outlet for providing the mixture as a liquid food.

In the preferred system, the channel has a cross-section configured to create shear stress in the flow of the liquid mixture sufficient to create foam in the liquid food. The cross-section of the channel has a width and a depth that is at least 25% of the width thereof, preferably at most about 150%, and more preferably around 100%.

The channel has a cross-sectional area normal to the flow of the liquid mixture of about between 0.01 $mm^2$ and 2.25 $mm^2$, and more preferably less than about 1 $mm^2$. Preferred dimensions of the channel cross-section are 0.1 mm to 15 mm of depth and width, more preferably less than about 1 mm, and most preferably between about 0.2 mm and 0.5 mm, with a preferred embodiment having 0.25 mm of depth and width. The channel may have a square cross-section, rectangular, or other shapes, including rounded and circular cross-sections with a radius in the ranges of depth and width listed above.

Preferably, the channel comprises a plurality of channels extending from a common area on the boundary wall. The channels have a length along that at least about an eighth of the dimension of the containment portion in the direction of the channel length, more preferably at least about a quarter as of said dimension. A preferred embodiment of the channel has a length of at least about 50% of the dimension of the boundary wall in the direction of the channel length.

The containment portion may comprise a food capsule that is receivable in an extraction chamber of a food preparation unit configured for feeding water into the capsule and comprising the outlet. The channel of this embodiment preferably comprises a slit extending partially through the boundary wall. A second wall can be disposed adjacent and substantially parallel to the boundary wall, with the channel formed by a slit extending substantially completely through one of the walls. Additionally, the food ingredient can comprise a predosed portion of a coffee, tea, cocoa, or milk product, or a combination thereof, in an amount for preparing a single serving of a beverage.

The containment portion can also comprises an extraction chamber of a food preparation device, with the containment portion configured for receiving a capsule that contains the food ingredient. A liquid feeder is preferably configured for feeding liquid into the capsule in the extraction chamber, and the outlet is connected with the extraction chamber downstream of the channel and configured for delivering the liquid food product.

In an embodiment of the invention, the boundary wall is configured for supporting a capsule wall of the capsule that is disposed thereagainst when the capsule is pressurized with liquid. The boundary wall preferably includes a bulged portion surrounded by a recessed portion, with the bulged portion configured for deforming the capsule wall into the capsule for supporting the wall to reduce or prevent rupture thereof when the capsule is pressurized. A preferred bulged portion comprises a dome, and has a lateral width along the boundary wall that is at least one fifth of the lateral width of the boundary wall facing a face of the capsule, more preferably at least about one half, and most preferably at least about 75%, or the lateral width may be 100% thereof. Outlet openings of the extraction chamber downstream of the channel and outside and adjacent the bulged portion drain the liquid food to the outlet.

The system can be a beverage dispensing machine with the outlet configured for filling a drinking cup at a dispensing location. A hot water supply with a heater and a pump are preferably connected to inject the water into the capsule.

An embodiment of the invention includes an opening member disposed within the contour of the boundary wall and being configured for producing an opening in the capsule when the capsule is pressurized. The opening member can be configured for piercing the capsule wall. The opening member may alternatively be configured for displacing a moveable openable portion from a closed configuration in which the openable portion closes the capsule to an open configuration in which the capsule is open to release the mixture.

A reservoir is preferably provided in the extraction chamber within the boundary wall and in which the opening member is disposed. The reservoir is disposed fluidly communicated upstream of the channel and configured for receiving the liquid mixture from the capsule and feeding the mixture to the channel and configured and dimensioned for allowing the maintenance of the supportive association between capsule wall and the boundary wall when the capsule is pressurized and the liquid is flowing out of the capsule. The reservoir allows the capsule to e opened without restricting the flow locally near the opening location, especially when the capsule is opened by piercing. The reservoir preferably has a lateral width of up to about 50% of the width of the bulge portion or of the boundary wall, and more preferably between about ¼ and ¹⁄₁₆ of the width or diameter. In a preferred embodiment, the reservoir is round and has a diameter of about ⅛ inches and a depth of about ⅛ inches. The preferred diameter or width is between about ¹⁄₁₆ inches and ¼ inches, and the depth is preferably between about ¹⁄₃₂ inches and ⅛ inches, in dispensers where single servings or cups of a beverage are produced at a time.

The channel is preferably open at one longitudinal side thereof, such as the top side that is open to the interior of the extraction chamber, or if the channel is part of the cartridge, the side that faces out of the cartridge, although the channel in the cartridge may be provided in face thereof. The open side is preferably closed upon contact of the boundary wall with the wall of a food capsule or an extraction chamber, respectively, when the capsule is pressurized.

A preferred capsule in the extraction chamber or after use advantageously has an inlet portion defining an inlet opening for receiving a flow of water. A wall portion bulges into the chamber for providing a shape that provides increased support by a wall of an extraction chamber of a device for producing an aqueous food product by flowing the water through the capsule chamber to mix with the food ingredient to form a liquid mixture. An exit portion defining an inlet opening in said wall portion configured for allowing the liquid mixture for exit therefrom and for promoting drainage of the chamber when the capsule is depressurized. Preferably, the inlet opening is disposed on a substantially opposite side of the capsule from the outlet opening.

One embodiment of a capsule has an openable portion disposed in an outlet wall that closes the chamber. The openable portion is configured for opening to an open configuration when depressed inwardly by an opening member of the extraction chamber when the cartridge is disposed therein. In the open configuration, the openable portion is configured for releasing the liquid mixture from the capsule. A flexible portion flexibly connects the openable portion to the outlet wall for allowing the openable portion to hinge to the open configuration when pressed into the capsule chamber by the opening member. The outlet wall is supportively associated with the openable portion for keeping the openable portion closed in response to internal pressure within the capsule chamber.

The outlet wall preferably defines an opening which is closed by the openable portion and has a first cross-section. The openable portion has a second cross-section aligned with and larger than the first cross-section to restrict the openable portion from opening outwardly from the capsule chamber. The openable portion can have a third cross-section aligned with and smaller than the second cross-section and disposed outwardly therefrom with respect to the capsule chamber.

Another embodiment of the openable portion defines a normally closed slit that is enlarged to an open configuration by action of the opening member for draining the liquid mixture from the capsule chamber. The outlet wall can comprise one or first and second layers, the first layer comprising the slit, and the second layer comprising an opening in fluid communication with the slit when the slit is in the open configuration for draining the liquid mixture from the capsule chamber. The openable portion is preferably configured for shearing a flow of the mixture exiting therethrough for producing foam therein and for retaining much of the pressure within the capsule during the mixing.

A preferred device for preparing a liquid food product includes a supportive wall associable with a capsule wall of the capsule for supporting the capsule wall during pressurization of the capsule with the liquid, as well as an opening member disposed within the contour of a supportive wall and being configured for producing an opening in the capsule when the capsule is pressurized. The supportive wall can be resiliently moveable when biased by the pressurized capsule wall for extending the opening member therefrom to open the openable member. The supportive wall preferably has a rounded contour for reducing localized stresses in the capsule wall, but may alternatively be flat or have steps. The supportive wall, or boundary wall in this embodiment, can define the channel or channels extending away from the opening member for directing the flow of the mixture therefrom to the outlet.

Preferably, extraction chamber is configured for positioning the capsule spaced from the opening member by a space sufficient to allow a sufficient pressure build up within the capsule to substantially mix the liquid and food ingredient. The space is sufficiently small such that the pressurized capsule will extend against the opening member for opening the openable member.

Other features and advantages of the invention will become apparent from the following description in conjunction with the accompanying drawings provided solely by way of example.

BRIEF DESCRIPTION OF THE DRAWINGS

Specific embodiments of the present invention will now be described with reference to the drawings of which:

FIG. 4 illustrates a cross sectional diagrammatic view of the capsule as positioned at rest within the housing of the beverage preparation unit;

FIG. 5 is a view similar to FIG. 4 but with water being introduced within the capsule and inside pressure starting to build up;

FIG. 6 is a view similar to FIGS. 4 and 5 but with the inside pressure at a level which causes the opening of the capsule and release of the beverage;

FIG. 7 is a view of detail of FIG. 5;

FIG. 8 is a view of detail FIG. 6;

FIG. 8A is a top view of the plunger showing the line of demarcation of the opening when fitting on the pressure surface of the plunger;

DETAILED DESCRIPTION OF THE PREFERRED EMBODIMENTS

Figure 1:
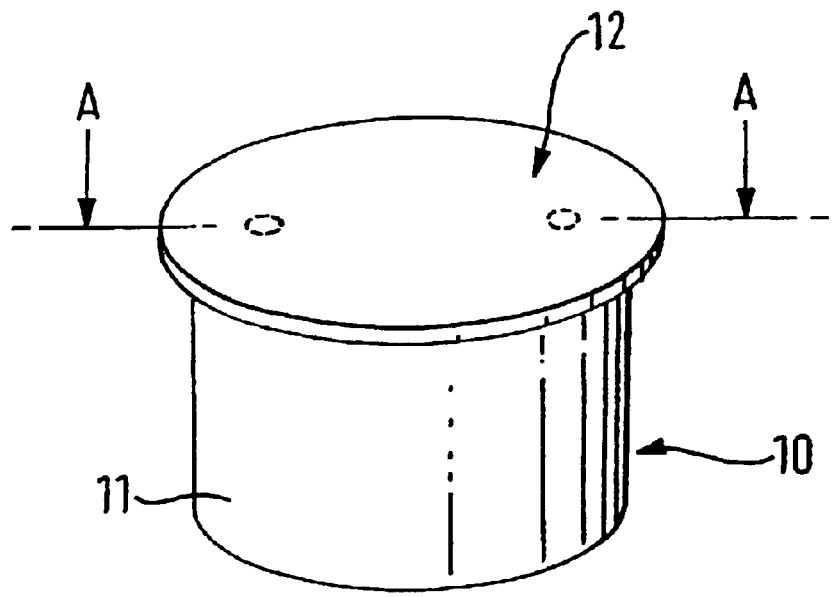
FIG. 1 is a perspective view of a capsule according to the invention.

Referring to FIGS. 1 to 3 and 3A, capsule 10 is adapted to contain a dry food substance, preferably a substance that is soluble by addition of a diluent such as hot water and the like to form a foamy beverage. As "foamy beverage" it is meant a beverage such as coffee, cappuccino, latte, tea, milk, cream-based beverage, cocoa, stock and a combination thereof. The capsule 10 may preferably comprise a cup-shaped body 11 and a coverlid 12. The lid forms the first surface of the capsule intended for the water to enter therethrough. The lid 12 may be attached to the body along a common peripheral edge 13 and sealed to the body by any suitable means such as by welding, adhesive or hot melt sealing and/or mechanical connection. The lid 12 may be provided with two small and diametrically opposed holes 14, 15 thereby leading to an internal cavity 16 containing the food substance. At the opposite side, a bottom side 17 is provided which forms a second surface of the capsule intended for the exit of the liquid beverage. The water is supposed to enter the first surface or lid 12 through the holes, create solubilization of the food substance and then, exit through the second surface or bottom side 17 as it will be explained in greater details later on. In an alternative, the two holes may be omitted and the lid of the capsule may be punctured at the time the beverage is prepared in the unit as it is also well known in the art.

Figure 2:
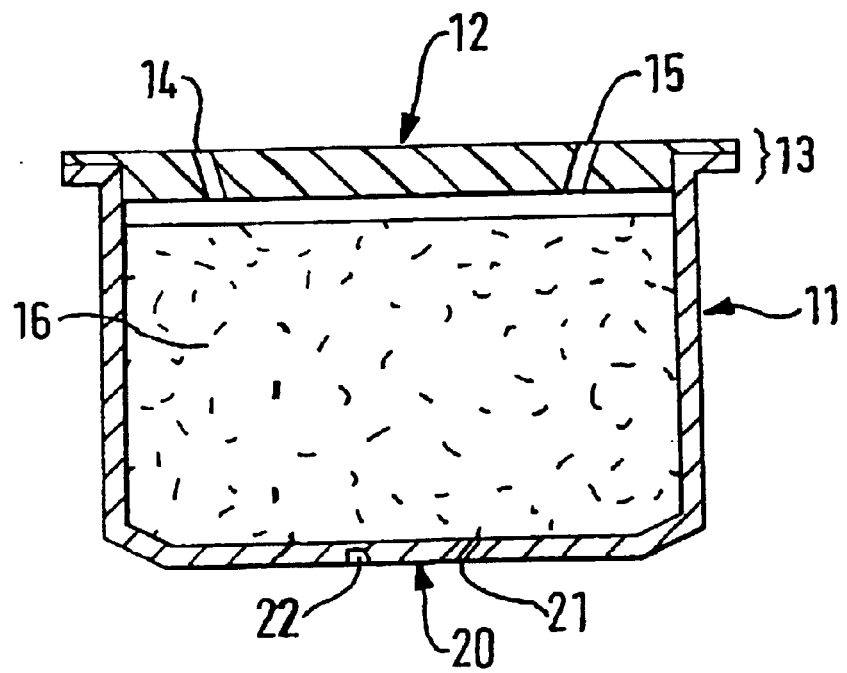
FIG. 2 is a cross sectional view along line A—A of the capsule of FIG. 1.
Figure 3:
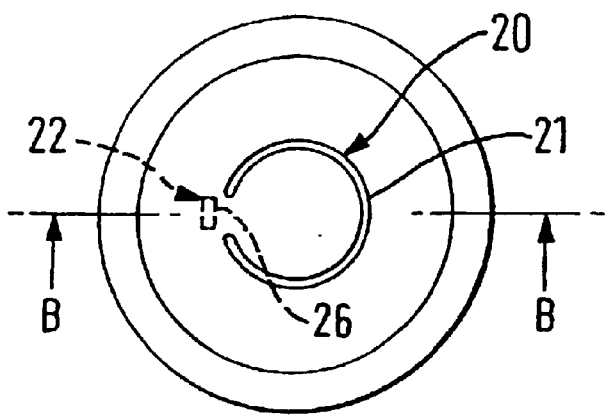
FIG. 3 is a bottom view of the capsule of FIGS. 1 and 2.
Figure 3A:
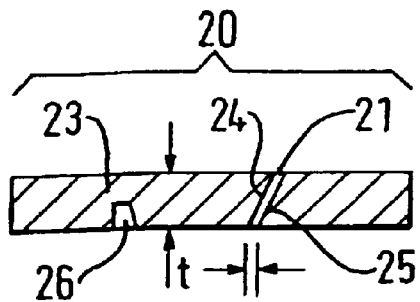
FIG. 3A shows a detail along line B—B of FIG. 3.

The body 11 of the capsule is preferably constituted of a pressure resistant but elastically deformable material such as a thin, semi-rigid plastic material. More particularly, the second surface or bottom side 17 of the capsule should be able to withstand an inside pressure of several bars; i.e., 1.5 to 15 bars, preferably 2–6 bars, while being capable of expanding outwardly as a response to such building-up of pressure. For that, the capsule may be made of plastic such as PP and PE or any other suitable food grade and heat and pressure resistant polymer material having a thickness of between 0.25 to 2 mm. As illustrated in FIGS. 2 to 3A, the bottom side comprises an openable member 20. The openable member includes a continuous precut line 21 which traverses the thickness "t" of the bottom side. The precut line 21 is preferably a portion of circle although its geometry is not limiting but may also encompass a large choice of other possible shapes. Folding member 22 is further provided which is arranged with the precut line so that the openable member is capable of folding inwardly along a predetermined folding line. For that, the folding member 22 may preferably be a single foldable portion 23 located between both ends of the precut line 21. The foldable portion is preferably yielding and non-recovering in the sense that when submitted to a flexure, the openable member does not recover its initial position it had before the flexure. This aspect ensures that when the pressure in the capsule starts decreasing due to the release effect, the opening remains open and the beverage can be fully dispensed.

In the preferred embodiment as shown, the openable member forms a valve which is arranged so that it can withstand a certain inside pressure while substantially closing and, conversely can open inwards as a response to an outside reaction force applied thereon. For that, the precut line 21 is beveled with the outer peripheral edge 24 of the opening member being capable of being supported by a complementary edge 25 of the bottom side when a pressure from inside builds up due to water under pressure entering the capsule. Therefore, the precut line is configured so that the cross-section of the opening member gradually decreases outwardly. In order to facilitate the inwardly oriented folding of the openable member, a line of weakness 26 may further be provided that promotes bending of the openable member along the predetermined line. Such line of weakness may, for instance, be a short outer groove or any suitable equivalent means.

The embodiment of the capsule as shown in FIGS. 1 to 3 and 3A is the preferred mode although other variants may provide equivalent results. Its has been determined that the precut line should preferably extend along a portion significant enough to be easily bent while limiting the risks of rupturing the plastic material. Preferably, the portion of the precut line should extend along an angular path of from 270 to 350 degrees, preferably 290 to 300 degrees. Similarly, the width of the precut line may be a determining factor that influences the building-up of inside pressure while it also ensures no significant amount of powder can escape from the capsule in the stored conditions. Therefore, it has been determined that the width of the precut line should preferably range from 0.05 to 0.3 mm, preferably from 0.1 to 0.2 mm.

Figure 3B:
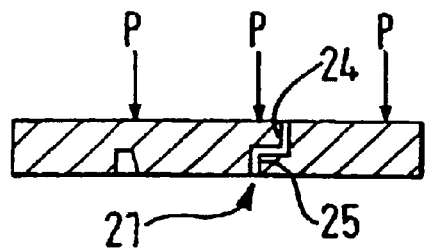
FIG. 3B shows a variant of FIG. 3A.

FIG. 3B illustrates a possible variant for the openable member in a configuration wherein it still acts as a valve having the ability to withstand a certain inside pressure level and conversely, opens under the effect of the outside reaction force. In this configuration, the precut line is shaped to form a stepped configuration with the peripheral edge 24 of the openable member being complementary shaped to be able to hold on the outer edge 25 of the opening of the bottom side as a result of a certain increase of pressure inside the capsule.

Figure 4A:
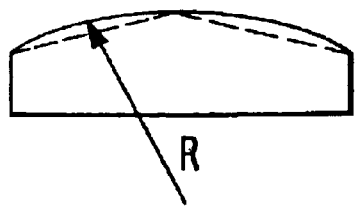
FIG. 4A illustrates a detail of the plunger of FIG. 4.

FIG. 4A illustrates the capsule of FIGS. 1 to 3A when lodged in position within an extraction chamber 3 of a beverage preparation unit. The unit comprises a main housing 30 of a size adapted to receive the body of the capsule while the upper edge 13 of the body is retained along a complementary peripheral shoulder 31 of the housing. In the bottom part of the housing 30 is provided a beverage outlet 32 for the release of the beverage toward a dispensing area 48.

According to an aspect of the invention, the beverage preparation unit comprises a reaction force generating member 4 for providing a mechanical reaction force to the openable member 20 of the capsule as a response to the deformation of the capsule; i.e., the outward or downward expansion of the second surface, due to the building-up of inside pressure during the water filling of the capsule. For that, the reaction force generating member 4 consists of a plunger 40 vertically aligned with the openable member 20 and the outlet 32. The plunger 40 is fixed in position on an apertured support 47 that leaves the outlet substantially open. More precisely, the plunger 40 includes a pressure surface 41 adapted to hold on the openable member 20. The pressure surface is arranged so that it has a surface larger than the surface of the openable member. The pressure surface also has a non-aggressive, smooth, and curved shape not to cause puncturing or piercing of the capsule but, on the contrary, to effect opening of the openable member 20 by gently moving the member inwards along an opening path of limited angulation along the folding portion of the member. For that, it is preferred to have a pressure surface that is bulged.

Figure 4B:
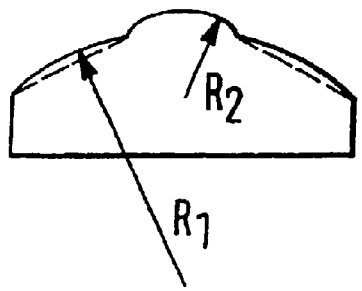
FIG. 4B illustrates a variant of FIG. 4A.

FIG. 4 illustrates a first embodiment of the plunger wherein the pressure surface is a single bulged portion of radius R. Suitable bulge radius R may preferably be of from about 40 to 80 mm. In order to release the pressure in a controlled manner, channels 42 are provided at the surface of the plunger which extend from the area intended to be covered by the opening when the plunger contacts the openable member. The channels preferably extend radially so as to distribute uniformly the foam and then, the liquid within the outlet. The channels are selected to determine the flow velocity and produces turbulences that creates the foam. Other configurations of channels could also possibly be proposed such as several channels which traverse through the plunger. FIG. 4B illustrates a second possible embodiment wherein the pressure surface is composed of a first main bulged portion of radius $R_1$ intersected in the center by a second smaller circular portion of radius $R_2$; with $R_2$ being smaller than $R_1$. As a preferred example, R1 ranges from 40 to 80 mm and $R_2$ ranges from 20 to 40 mm.

As shown in FIGS. 4 and 7, when in at rest position; i.e., before the water pressurization, the housing of the unit is dimensioned so that the capsule, more specifically the openable member 20 of the capsule, is kept spaced from the pressure surface 41 by a gap "d" to generate a desired increase of pressure inside the capsule as the valve of the openable member is sufficient to withstand that amount of pressure.

The preparation cycle is demonstrated in accordance with FIGS. 4 to 8. In a first stage, the capsule is positioned in the housing of a first unit part 37 and locked in position by means of an upper part 33 of the unit. The upper unit part 33 comprises a water distribution chamber 34 with a water feeder system, including a water inlet 36, and a watertight seal 35 adapted to render the chamber watertight upon closing. The lower unit part 37 and the upper unit part 33 engage together in closure by any suitable driver such as an hydraulically driven assembly 49. In a closed configuration of the housing, the plunger 40 is positioned at a distance from the capsule and there is a small predetermined gap "d" between the capsule openable member and the pressure surface (FIG. 4). The gap is determined as a function of the intended pressure to build inside the capsule. Repeated tests have shown that it should preferably be of from 0 to 5 mm, preferably 0.1 to 3 mm.

As shown by FIG. 5, pressurized hot water enters the capsule through the two small holes 14, 15 of the lid and mix with the powder inside the capsule. As more water enters the capsule, the inside pressure starts building up so causing the body of the capsule, and more particularly, its bottom side, to deform outwardly. As the bottom deforms, the distance between the plunger and the capsule starts lessening until the openable member 20 of the capsule comes into abutting contact with the pressure surface 41 of the plunger as shown in FIG. 5. The capsule keeps deforming outwards till the pressure surface of the plunger starts applying a reaction force to the inside pressure. Such reaction force as gradually increasing acts on the openable member which flexes along its folding portion 23 (FIGS. 6 and 8). As shown by FIGS. 8 and 8A, in its periphery, the bulged surface 40 is adapted to substantially fit the peripheral contour or demarcation line 26 of the opening as the surface of the capsule deforms outwards while pushing against the openable member in the center of the surface. As the openable member moves inwards, the liquid mixture which has reached a desired pressure inside is released through the radial channels 42 provided on the pressure surface. The pressure that is released after the beverage exits the channels generates foam in the beverage and the pressure inside the capsule becomes stabilized (FIG. 6). At the end of the dispensing, the water stops entering the capsule and the plunger separates from the capsule as the capsule substantially or partially generally recovers its initial dimension due to the release of inside pressure. As the openable member has the ability to remain open, the beverage remaining inside the capsule can be fully discharged to the outlet.

Figure 9:
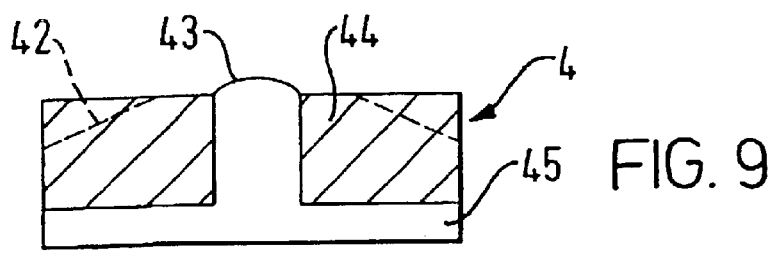
FIG. 9 is an embodiment of the opening portion of the beverage preparation unit.
Figure 10:
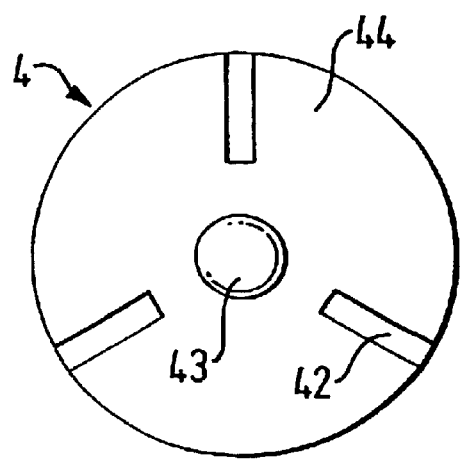
FIG. 10 is a top view of the opening portion of FIG. 9.

FIGS. 9 and 10 illustrate a variant of the reaction force generating member or plunger 4. In this variant, the pressure surface comprises a solid central part 43 surrounded by an outer resilient part 44. The solid central part may be a metal or solid plastic piece forming a rod extending from a support base 45 of the plunger. The outer part 44 may be a rubber or soft plastic annular piece that is capable of compressing when contacting the openable member of the capsule. The compressibility of the outer part 44 may be important depending upon the particular geometry and configuration of the capsule to reduce the risks of damaging the capsule.

Figure 11:
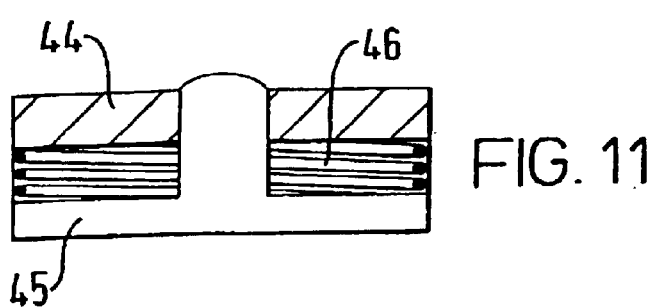
FIG. 11 is another embodiment of the opening portion.

FIG. 11 refers to another variant of the plunger which differs from the previous version by the fact the outer part remains a solid piece but is spring biased using a spring element 46 located between the outer part 44 and the supportive base 45.

Figure 12:
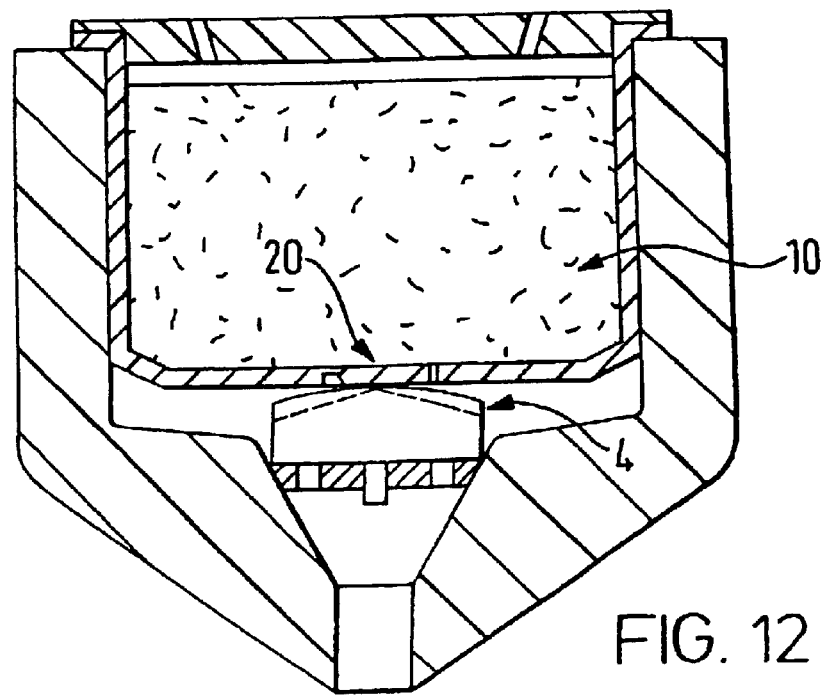
FIG. 12 is a cross sectional view of the capsule as positioned at rest within the housing of the beverage preparation unit according to another embodiment of the invention.

FIG. 12 is another possible embodiment of the invention wherein the reaction force generating member 4 is positioned to hold the capsule 10 before the capsule is even pressurized with water. In that particular case, the openable member 20 may not necessarily be a valve but may require the support of the reaction force generating member to prevent opening before a sufficient pressure level is achieved inside the capsule. More particularly, the openable member 20 of the capsule may include a precut line that is not beveled or stepped but simply cut normal to the bottom surface of the capsule so that the pressure surface forces the openable member to open.

In the foregoing description, the reference to the term "capsule" has been made for designating any sort of containers suitable for the intended purpose. The term "plunger" may encompass various designs and/or configurations suitable for the intended purpose. The terms "inwards" or "inwardly", "outwards" or "outwardly" or "downwards" or "downwardly" have been used in reference to the capsule when in operation in the beverage preparation apparatus; more particularly, to designate the direction of deformation of the second surface or bottom side of the capsule and its openable member.

Figure 13:
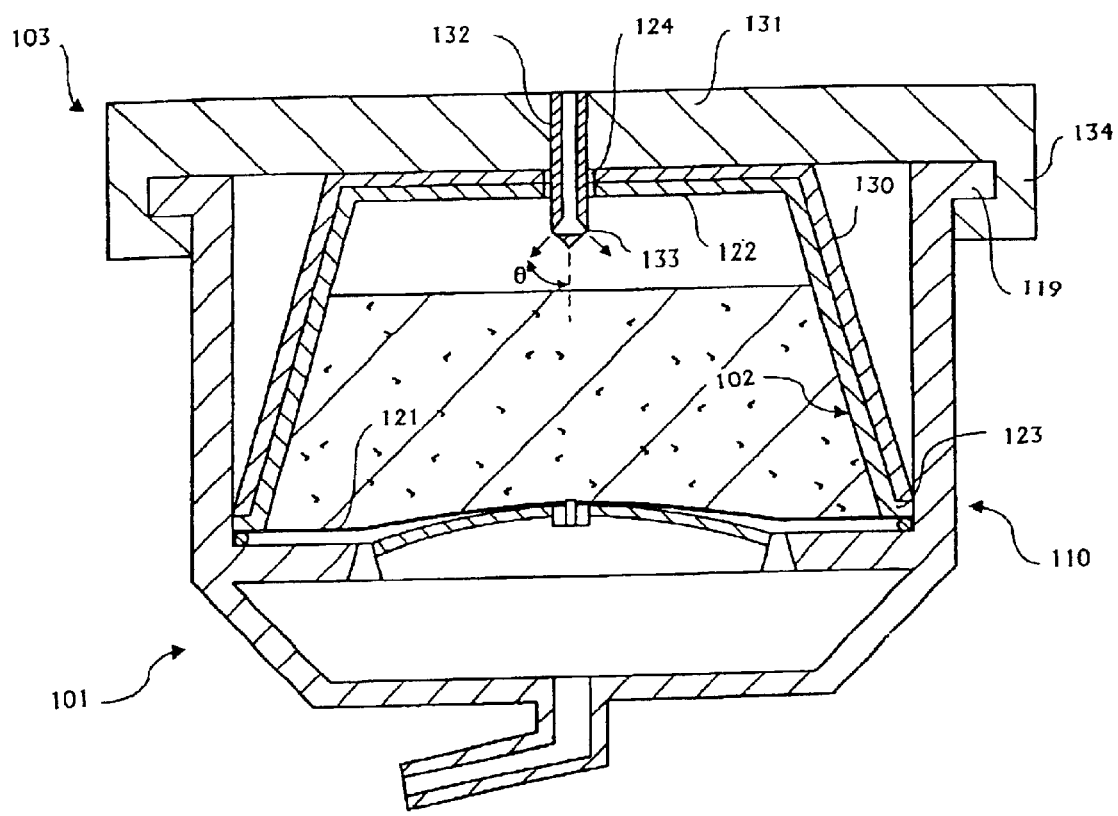
FIG. 13 is a cross-sectional diagrammatic view of another embodiment of the device and capsule as positioned in the device in the beverage preparation stage.
Figure 14:
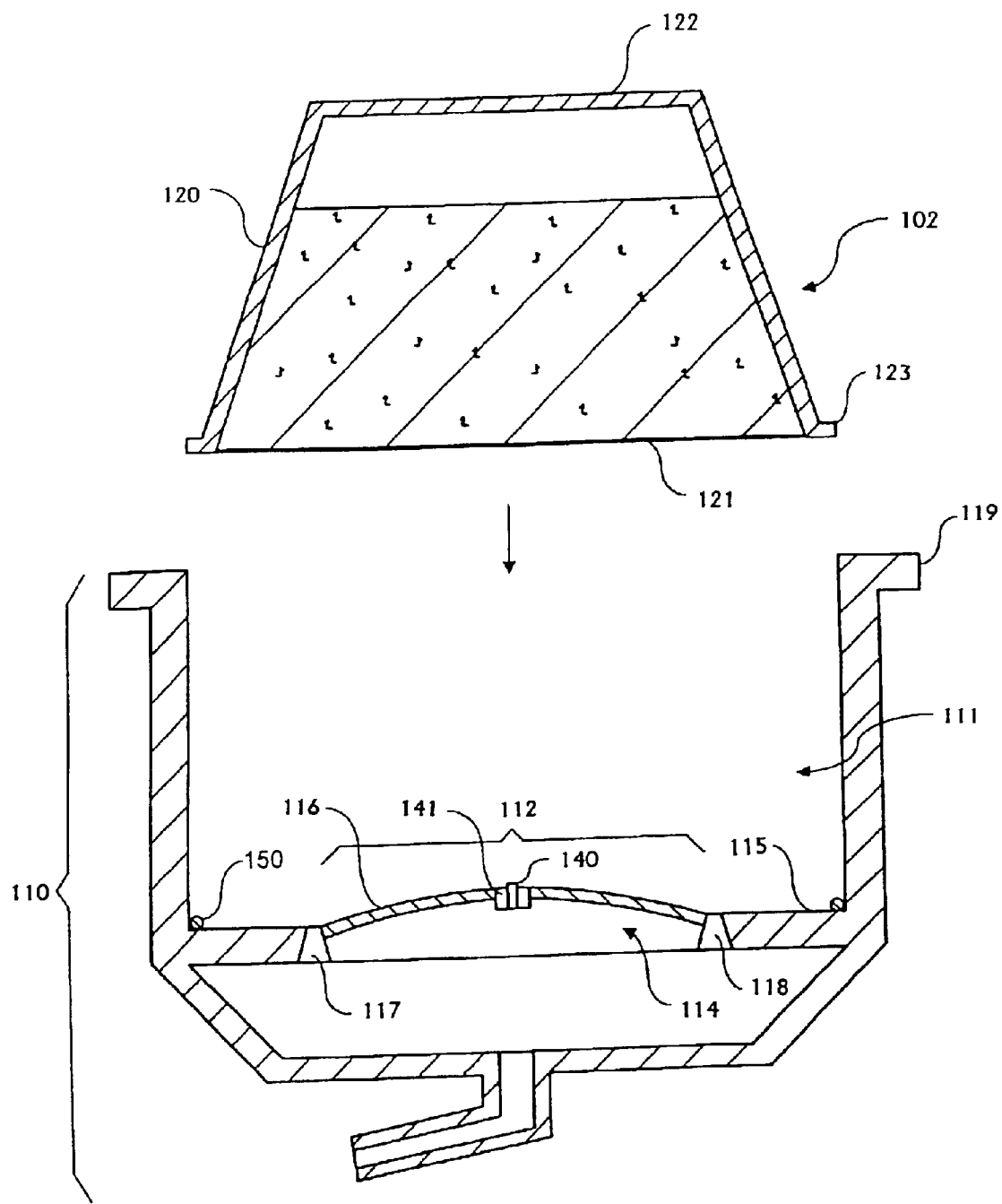
FIG. 14 is a cross-sectional view of the holder of the device and the capsule when inserted in the holder before closure of the device.
Figure 15:
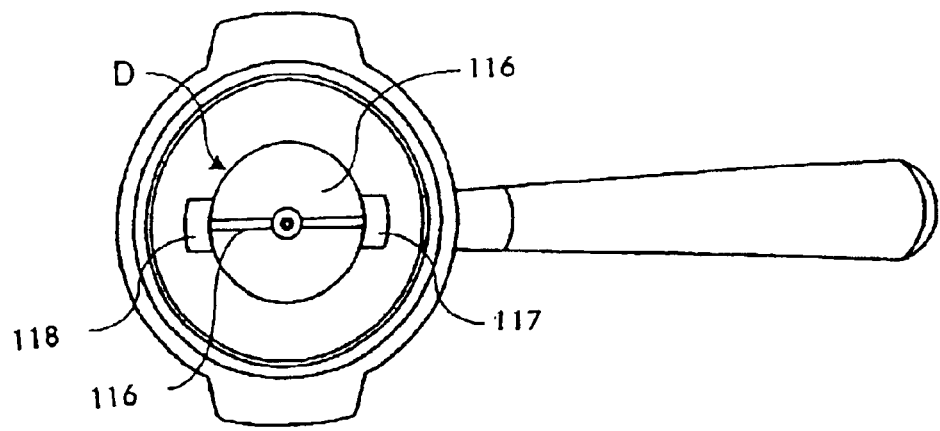
FIG. 15 is a top view of the holder showing the beverage and foam conditioner.
Figure 16:
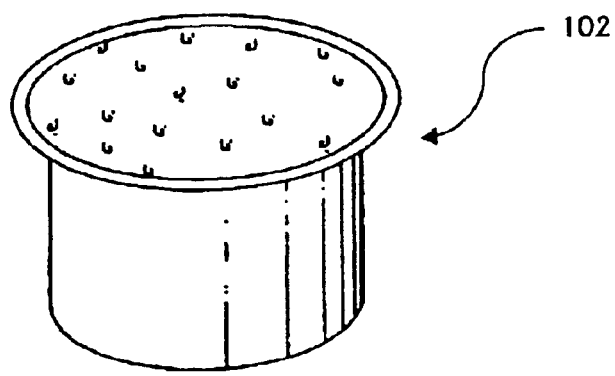
FIG. 16 is a perspective view of a capsule of the invention.

Referring to FIGS. 13 to 15, the invention illustrates a device 101 for preparing a liquid food such as a beverage and the like from a single-use capsule 102. In this embodiment, the capsule 102 is a closed capsule that contains a dry food, preferably a substance that is soluble by addition of a diluent such as hot water, milk and the like to form a foamy, frothy beverage. Suitable foamy, frothy beverages are, for instance, coffee with crema, cappuccino with a milk based foamy head, late or cocoa. In the embodiment, the capsule 102 has a frustoconical shape with an inverted cup part 120 and a lid part 121. The lid part 121 provides the discharge side of the capsule whereas the top 122 of the inverted cup part provides the entry side of the capsule. The cup part 120 has preferably a peripheral lip extending outwardly onto which is attached the edge of the lid part 121. The connection at the lip may be carried out by sealing or crimping or both. The shape of the capsule for the general purpose of the invention and the capsule could also take frustoellipsoidal, frustospherical or cylindrical shapes, as well as other suitable shapes.

The device comprises a cup-shaped holder 110 adapted to receive the capsule 102 in a suitable seat 111. The seat 111 has a bottom side comprising beverage and foam conditioner 112 adapted to open the capsule 102 for release of the beverage and hold pressure within the capsule. More particularly, the beverage and foam conditioner comprise a bulged engaging member 114 that protrudes slightly from the bottom surface 115 of the seat. The bulged engaging member 114 forms an engaging surface 116, as more apparent in FIG. 15, that is intended to snuggly engage a portion of the discharge side 121. The bulged engaging member has a general rounded profile of preferably large average radius. The configuration and geometry of the bulged member should be determined in the perspective of creating a tight contact with the underside of the lid when the capsule is pressurized with water without risk of tearing off the lid material along the engaging surface. The bulged member may provide a contact against 20 to 99% of the total surface of the discharge side 121, preferably, 40 to 80% of the total surface. As preferred example, the bulged member has the following geometry: diameter "D" of from 20 to 70 mm, average radius of from 30 to 150 mm, maximum height (relative to surface 15) of from 5 to 20 mm.

In the center of the bulged member 114 is located an opening member 140 in the form of a small pin or needle that is intended to puncture a hole in the lid 121 of the capsule in a precise location. The pin or needle is located in a reservoir 141 that separates it from the engaging surface 116. The pin 140 may protrude from the bulged member or be flush with the bulged member or be even slightly inset relative to the bulged member. If the pin protrudes from the bulged member, the capsule can be perforated, or starts partially being perforated, at the time it is seated in the holder by the user since the pin is the first part of the holder entering into contact with the lid. If the pin is flush or inset, the capsule opens by the effect of the pressure building up within the capsule. The pin is relatively thin, with a tip configured for puncturing the capsule, but preferably blunt enough to prevent the user from getting injured in case of contact with it. The pin's tip may be slightly rounded but still providing a suitable puncturing effect on the lid. More than one pin could be provided to increase the opening if necessary.

The reservoir 141 that surrounds the opening member 140 serves as a buffer part for the liquid to flow and to avoid blockage from the capsule punctured edges. The reservoir can be of a relatively small size, preferably 0.01 to 0.1 time the diameter of the engaging bulged surface D and of a depth of from 0.01 to 0.5 times the height of the bulged surface.

In order to release the pressure in a more controlled manner, channels 116 are provided at the surface of the bulged member 114 which preferably extend radially. The channels offer a privilege path for the liquid to flow between the engaging surface and the lid in a substantially radial direction. The channels preferably extend from the reservoir to the peripheral line of the bulged member as better shown in FIG. 15. The channels are between 101 and 108, preferably 102 to 104. The channels also produce additional shear stress on the liquid for increasing the production of froth on the liquid. Another equivalent pressure control device could replace the channels such as small corrugations or the rugosity of the bulged member could also be increased. The structure of the pressure control device should preferably be such that it does not substantially tear the lid.

The beverage exiting the capsule 102 finds its way out of the holder 110 by outlets 117, 118 that are situated in the bottom wall of the outlet, preferably at or close to the periphery of the bulged member. Channels 116 may be distributed in a preferred way to direct the flow through the outlets 117, 118 but this is not mandatory. The outlets could also be provided through the bulged member itself and made thinner and more numerous to replace the channels to create shearing on the liquid exiting the device.

FIG. 13 shows the capsule as in operational conditions of beverage preparation when the device is closed in a fluid tight relation around the capsule and water flows within the enclosure of the capsule. The device comprises an upper water supply assembly 103 adapted to cooperate in closure with the lower holder 110. A cup or bell-shaped shaped member 130 of the assembly 103 is arranged to engage in closure the sidewall 120 and top wall 122 of the capsule down to the sealing ring 150 of the holder. More precisely, the lower edge of the member 130 holds on the lip 123 of the cup shaped part of the capsule against the ring 150 placed underneath the lip. The bell like member is securely attached to an upper base member 131 of the assembly that supports at its periphery attachment 134 of ramp type complementary to the bayonet type portion 119 of the lower holder 110.

The water supply is carried out by a needle like water injector 132 with water outlets 133 arranged in such a way that the water is injected a few millimeter below the upper side 122 of the capsule and are thus remote from the pierced zone created by the penetration of the injector. The outlets may be disposed for directing water ejected from the injector at an outward orientation with a positive inclination angle q relative to the longitudinal axis of the injector so as to promote dispersion of water as well as a vortex effect inside the enclosure of the capsule. In a possible variant (not shown), water could, as well, be injected from the sidewall of the capsule in one or more points.

Upon closing of the water supply assembly, the lid of the capsule tends to press on the bulged engaging surface so as to deform inwardly. Further deformation and tight contact are obtained after water is injected within the capsule and pressure has started to build up inside. Such a tight fitting between the discharge side of the capsule and the device enables to control and retard release of the beverage by holding sufficient pressure within the capsule until the soluble substance can thoroughly mix with water by creation of turbulence and vortex and, therefore, a sufficient amount of gas can be entrapped as resulting from these turbulence and vortex for a certain time.

Figure 17:
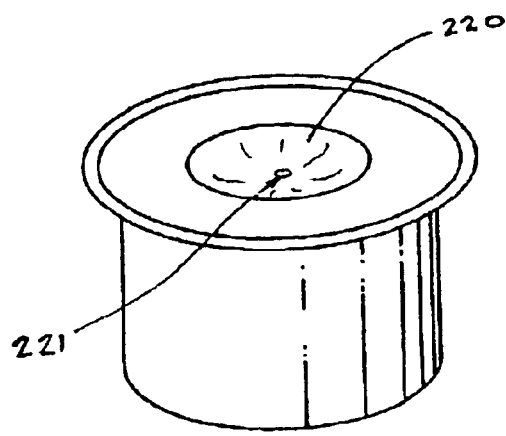
FIG. 17 is a perspective view of a used capsule after beverage preparation.
Figure 28:
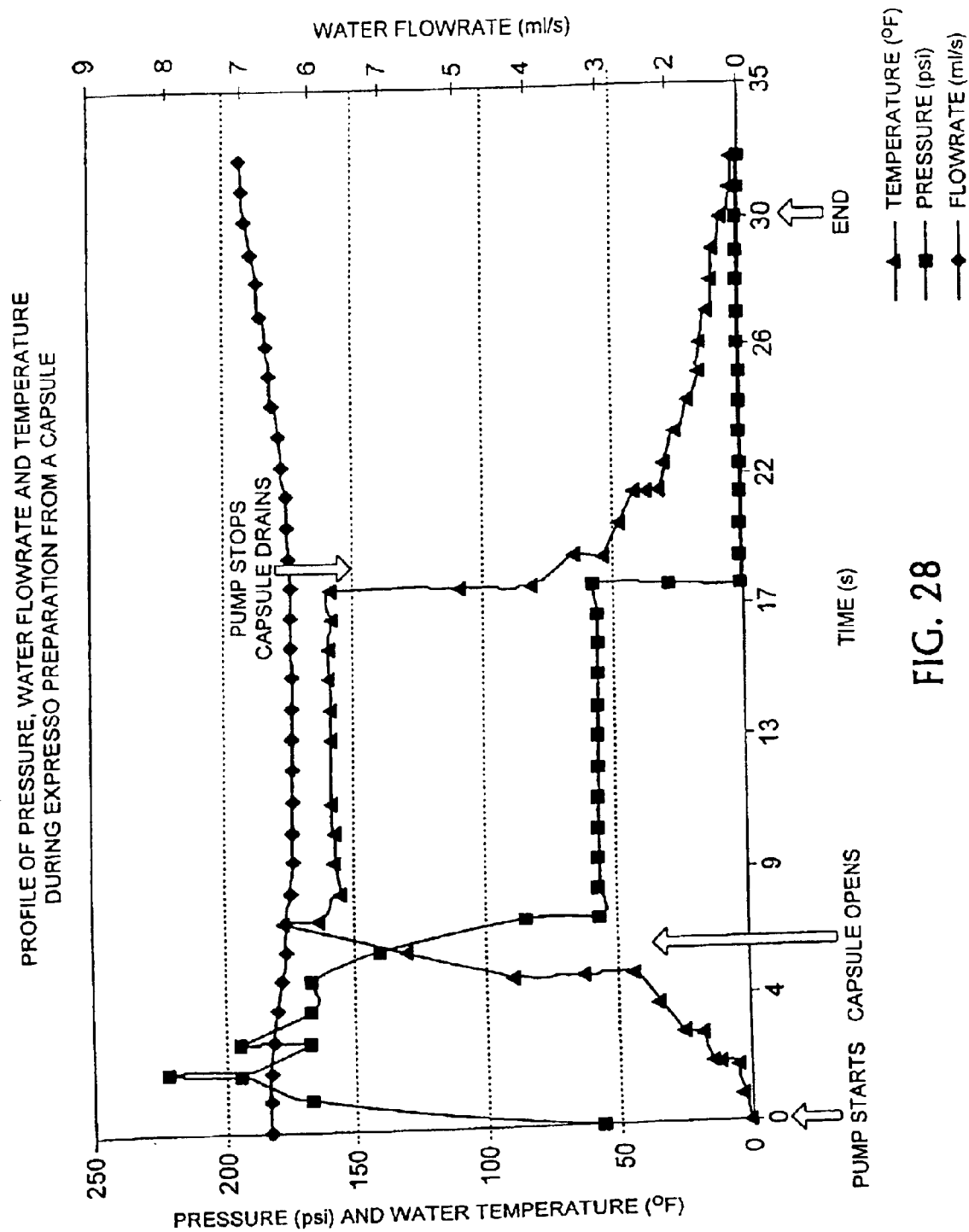
FIG. 28 illustrate a graph of typical profiles of pressure, water flow rate and temperature during the preparation of a liquid food from a capsule and device of the present invention.

The pressure inside the capsule may vary from 1 to 15 bar, preferably 4 to 10 bar. A pressure of at least 4 bar should preferably be maintained of from 10 to 30 seconds, preferably 10 to 20 seconds to enable the water and powder to thoroughly mix together and gas to be entrapped in the mixture in sufficient amount. The pressure is maintained sufficiently within the range, as defined, by a pump of the device that compensates for some liquid draining through the discharge side. However, the pressure can easily be maintained by the pump as resulting from the engaging surface retarding the liquid release in the cup. As the water pump is stopped, pressure in the capsule drops and the engagement of the discharge surface and bulged member decreases, i.e., the contact between the lid 121 and the dome surface 116 is loosen, thus promoting complete draining of the residual liquid food through the opening of the discharge side. The profiles of pressure, water flow rate and temperature are shown in FIG. 28 as one achievable example. A used capsule is shown in FIG. 17, which shows a portion of an outlet wall 220 bulged inwardly, with an outlet opening 221 at its center.

Figure 18:
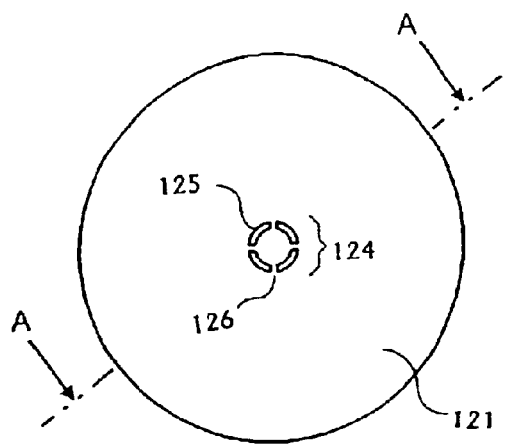
FIG. 18 is a view of a capsule lid according to a variant of the invention.
Figure 19:
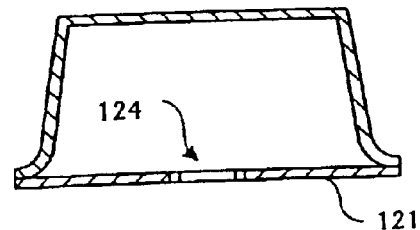
FIG. 19 is a view of the capsule of FIG. 18 along line A—A.

FIGS. 18 and 19 illustrate a possible variant of the capsule of the present invention in a configuration wherein the discharge side 121 of the capsule comprises an integrated openable member 124 against which a finger 140 of the device can act in pushing engagement to release liquid from the capsule. More preferably, the openable member is formed of at least one, preferably, a plurality of precut lines or slits 125. These precut lines or slits are adapted for release of the liquid once a pressure is exerted in the vicinity of them that would enlarge the section of the lines or slits. For example, these precut lines or slits 125 may be arranged to form a geometrical pattern such as a circular pattern, with solid regions 126 inserted between two adjacent precut lines or slits 125. Release of liquid is promoted by a pressure exerted by the finger having a smaller section against the openable member. The pressure exerted on the openable member tends to flex the openable member inward to enlarge the section of the slits sufficiently so that liquid mixture can drain therethrough. The dimension and configuration of the finger is determined to achieve a certain sufficient flexure of the openable member by the finger without breaking of the solid interconnecting regions so that the total opening area is sufficient for liquid release but maintained sufficiently small for creating shear stress and for limiting the risks of bits of material falling into the serving cup. The precut lines should be of a sufficiently small width, e.g., less than 200 microns, so that no significant amount of liquid could drain without a positive pressure exerted thereon by a finger of the device. In the present context, the "precut lines" refer to any local cutting zone made entirely or partially (e.g., weakening zones) through the thickness of the material of the discharge wall. If the precut lines are weakening zones, they should be able to break to form opening areas under the pressure exerted by the finger. The capsule of FIGS. 18 and 19 is capable of fitting the beverage preparation device of FIGS. 13 to 15, possibly with the central puncturing tip being replaced by a non-puncturing finger tip of suitable length and diameter, or a rough textured surface, to achieve the intended release function.

Figure 20:
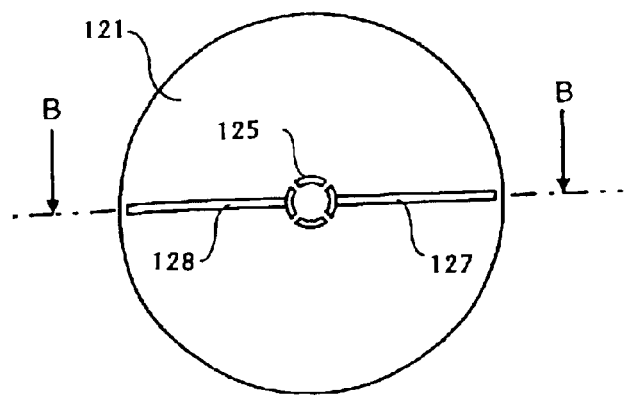
FIG. 20 is a view of a capsule lid according to another variant of the invention.
Figure 21:
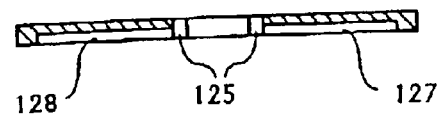
FIG. 21 is a view of the capsule of FIG. 20 along line B—B.

FIGS. 20 and 21 show another possible variant of the capsule with the lid comprising a built-in passage(s) to control release of the liquid beverage at the interface between the engaging surface, e.g., the bulged member, and the discharge outer surface 121. These passages may comprise channels 127, 128 oriented from the vicinity of the openable member, preferably from a cutting line 125, in a substantially radial direction therefrom. The orientation of the channels promotes the exit of the liquid beyond the engaging surface to ensure a sufficient flow of liquid while frothing the liquid. The passages could also be formed by corrugations or similar recessed or protruding structures preferably oriented in a similar direction. The passages on the capsule's surface can replace partly or wholly the passages located on the engaging surface. The passages could also be provided in a puncturable capsule.

Figure 22:
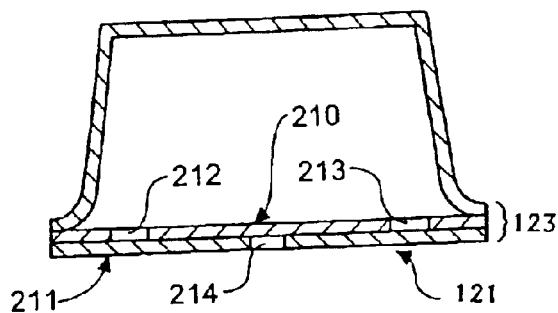
FIG. 22 is a cross-sectional view of a capsule according to another variant of the invention.
Figure 23:
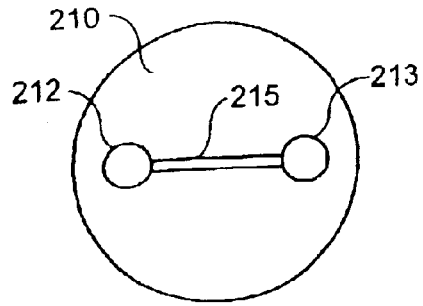
FIG. 23 is a view of the inner layer of the discharge side of the capsule of FIG. 22.
Figure 24:
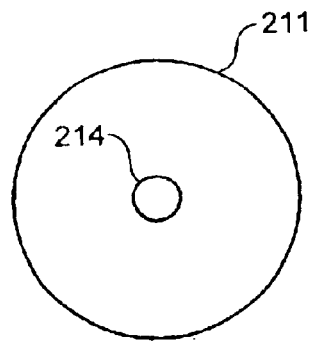
FIG. 24 is a view of the outer layer of the discharge side of the capsule of FIG. 22.

FIGS. 22 to 24 show yet another embodiment of the capsule with a discharge side or lid 121 comprising two adjacent layers 210, 211 sealed along the edge 123 of the capsule. Each layer has passages 212–214 for the beverage for the beverage to pass through the layers. The passages may include holes, slits or similar apertures. The passages 212, 213 of the internal layer are offset with respect to the passages 214 of the outer layer so as to create a tortuous path for the beverage through the discharge side 121. Channels 215, in shape of a straight line or any other curve configuration, may be added in one or the other internal surfaces of the layers, e.g., the internal surface of the inner layer 210, to create shear and control the desired pressure inside the capsule. As a result of this variant, there is no need for an opening member of the device and product cross-contamination can be significantly reduced accordingly. The beverage and foam conditioner of the preparation device can be simplified since only the engaging surface, i.e., the bulged surface, is retained to hold on the discharge side 121, but the opening member and reservoir are removed.

Figure 25:
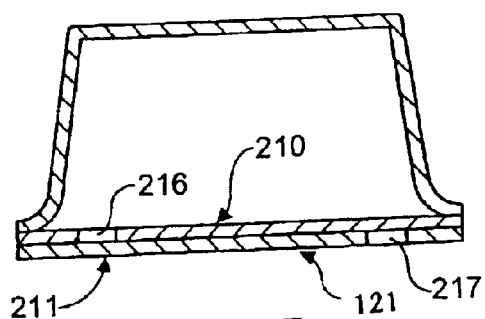
FIG. 25 is a cross-sectional view of a capsule according to yet another variant of the invention.
Figure 26:
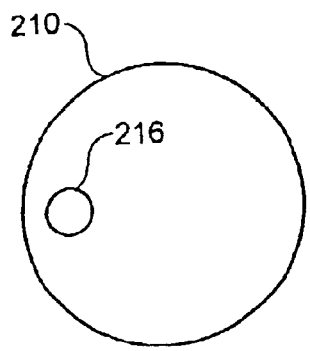
FIG. 26 is a view of the inner layer of the discharge side of the capsule of FIG. 25.
Figure 27:
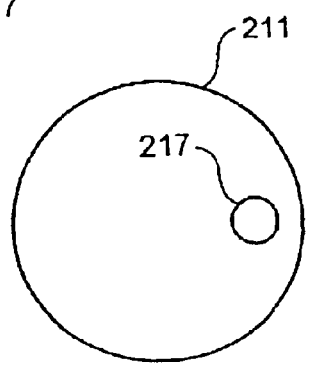
FIG. 27 is a view of the outer layer of the discharge side of the capsule of FIG. 25.

FIGS. 25 to 27 show yet another embodiment in the same vain as the one of FIGS. 22 to 24. A difference resides in the number and location of the passages 216, 217 of the two layers. The inner layer may be built with only one passage 216 while the outer layer may have a single passage 217, both passages 216, 217 being transversally offset one another.

The invention described and claimed herein is not strictly limited in scope by the specific embodiments herein disclosed, since these embodiments are intended as illustration of several aspects of the invention. Any equivalent embodiments are intended to be within the scope of this invention. Indeed, various modifications of the invention will become apparent those skilled in the art from the foregoing description. Such modifications are also intended to fall within the scope of the appended claims.

What is claimed is:

1. A system for preparing a liquid food, comprising:
a containment portion configured for containing a food ingredient and for receiving a liquid supplied to flow therethrough in contact with the food ingredient to produce a liquid-food mixture;
a boundary wall having a wall surface extending along a peripheral portion of the containment portion; and
at least one elongated channel extending along the wall surface and disposed downstream of the containment portion for receiving the liquid mixture and directing the liquid mixture along the wall surface to an outlet for providing the mixture as a liquid food, wherein the channel has a cross-section configured and dimensioned to create shear stress in the flow of the liquid mixture sufficient to create foam in the liquid food.

2. The system of claim 1, wherein the cross-section of the channel has a width and a depth that is at least 25% of the width thereof.

3. The system of claim 1, wherein the channel has a cross-sectional area normal to the flow of the liquid mixture of more than 0.01 mm$^2$ and less than 1 mm$^2$.

4. The system of claim 1, wherein the channel comprises a plurality of channels extending from a common area on the boundary wall.

5. The system of claim 1, wherein the channel has a length along that at least about an eighth of the dimension of the containment portion in the direction of the channel length.

6. The system of claim 1, wherein the channel length has a length of at least about 50% of the dimension of the boundary wall in the direction of the channel length.

7. The system of claim 1, further comprising a food capsule that comprises the containment portion and boundary wall, the food capsule being receivable in an extraction chamber of a food preparation unit configured for feeding water into the capsule and comprising the outlet, and further wherein the channel comprises a slit extending along the boundary wall.

8. The system of claim 7, wherein the capsule further comprises a second wall disposed adjacent and substantially parallel to the boundary wall, wherein the slit extends substantially completely through the boundary wall.

9. The system of claim 7, further comprising the food ingredient, which comprises a predosed portion of a coffee, tea, cocoa, or milk product, or a combination thereof, in an amount for preparing a single serving of a beverage.

10. The system of claim 1, wherein the containment portion comprises an extraction chamber of a food preparation device, the containment portion configured for receiving a capsule that contains the food ingredient, the system further comprising:
a liquid feeder configured for feeding liquid into the capsule in the extraction chamber; and
the outlet, which is connected with the extraction chamber downstream of the channel and configured for delivering the liquid food product.

11. The system of claim 10, wherein the boundary wall is configured for supporting a capsule wall of the capsule that is disposed thereagainst when the capsule is pressurized with liquid.

12. The system of claim 10, wherein the outlet is configured for filling a drinking cup at a dispensing location.

13. The system of claim 10, wherein the extraction chamber comprises an opening member disposed within the contour of the boundary wall and being configured for producing an opening in the capsule when the capsule is pressurized.

14. The system of claim 13, wherein the opening member is configured for piercing the capsule wall.

15. The system of claim 13, wherein the opening member is configured for displacing a moveable openable portion from a closed configuration in which the openable portion closes the capsule to an open configuration in which the capsule is open to release the mixture.

16. The system of claim 13, wherein the extraction chamber further defines a reservoir disposed within the boundary wall and in which the opening member is disposed, the reservoir being disposed fluidly communicated upstream of the channel and configured for receiving the liquid mixture from the capsule and feeding the mixture to the channel and configured and dimensioned for allowing the maintenance of the supportive association between capsule wall and the boundary wall when the capsule is pressurized and the liquid is flowing out of the capsule.

17. The system of claim 1, wherein the channel is open at one longitudinal side, which is closed upon contact of the boundary wall with the wall of a food capsule or an extraction chamber when the capsule is pressurized.

18. The device of claim 1, wherein the cross-section of the at least one channel has a width of less than about 0.25 mm.

19. The device of claim 1, further comprising the food ingredient in the form of a soluble powder.

20. The device of claim 10, wherein the channel has a cross-sectional area normal to the flow of the liquid mixture of more than 0.01 mm$^2$ and less than 1 mm$^2$, and the liquid feeder and containment portion are configured to maintain a pressure of the liquid in contact with the food ingredient of at least about 4 bar.

21. A system for preparing a liquid food, comprising:
   a containment portion configured for receiving a capsule that contains a food ingredient and for receiving a liquid supplied to flow therethrough in contact with the food ingredient to produce a liquid-food mixture, the containment portion comprising an extraction chamber of a food preparation device;
   a boundary wall having a wall surface extending along a peripheral portion of the containment portion, wherein the boundary wall comprises a bulged portion, the bulged portion being configured for deforming a wall of the capsule into the capsule for supporting the wall that is disposed thereagainst to reduce or prevent rupture thereof when the capsule is pressurized with liquid;
   at least one elongated channel extending along the wall surface and disposed downstream of the containment portion;
   a liquid feeder configured for feeding liquid into the capsule in the extraction chamber; and
   an outlet is connected with the extraction chamber downstream of the channel, wherein the channel is configured for receiving the liquid mixture and directing the liquid mixture to the outlet for providing the mixture as a liquid food, the outlet being configured for delivering the liquid food product.

22. The system of claim 21, wherein the bulged portion comprises a dome.

23. The system of claim 21, wherein the bulged portion is surrounded by a recessed portion and has a lateral width along the boundary wall that is at least of the lateral width of the boundary wall facing a face of the capsule.

24. The system of claim 21, wherein the extraction chamber comprises outlet openings downstream of the channel and outside and adjacent the bulged portion for draining the liquid food to the outlet.

25. A system for preparing a liquid food product, comprising:
   an extraction chamber comprising the outlet;
   a capsule receivable in the extraction chamber, wherein the extraction chamber is configured for feeding a liquid into the capsule, the capsule comprising;
      a containment portion configured containing a food ingredient and for receiving the liquid supplied to flow therethrough and in contact with the food ingredient to produce a liquid-food mixture,
      an outlet wall closing the containment portion, and
      an openable portion disposed in the outlet wall having a weakened portion configured for allowing the openable portion to open to an open configuration when the openable portion is depressed inwardly, the openable portion in the open configuration being configured for releasing the liquid-food mixture from the capsule; and
   an opening member protruding towards the extraction chamber and configured and disposed for depressing the openable portion for fluidly communicating the liquid-food mixture with the outlet;
   wherein the containment portion and outlet wall are configured and associated for displacing the openable potion against the opening member in response to increased internal fluid pressure for opening the openable portion.

26. The system of claim 25, further comprising a flexible portion flexibly connecting the openable portion to the outlet wall for allowing the openable portion to hinge to the open configuration when pressed into the capsule chamber by the opening member.

27. The system of claim 26, wherein the outlet wall is supportively associated with the openable portion for keeping the openable portion closed in response to internal pressure within the capsule chamber.

28. The system of claim 27, wherein:
   the outlet wall defines an opening which is closed by the openable portion and has a first cross-section; and
   the openable portion has a second cross-section aligned with and larger than the first cross-section to restrict the openable portion from opening outwardly from the capsule chamber.

29. The system of claim 28, wherein the openable portion has a third cross-section aligned with and smaller than the second cross-section and disposed outwardly therefrom with respect to the capsule chamber.

30. The system of claim 26, wherein the openable portion defines a normally closed slit that is enlarged to an open configuration by action of the opening member for draining the liquid mixture from the capsule chamber.

31. The system of claim 30, wherein the outlet wall comprises first and second layers, the first layer comprising the slit, and the second layer comprising an opening in fluid communication with the slit when the slit is in the open configuration for draining the liquid mixture from the capsule chamber.

32. The system of claim 26, wherein the openable portion is configured for shearing a flow of the mixture exiting therethrough for producing foam therein.

33. A device for preparing a liquid food product, comprising:
   an extraction chamber configured for receiving a capsule that contains a food ingredient;
   a liquid feeder configured for feeding liquid into the capsule in the extraction chamber;
   an outlet connected with the extraction chamber and configured for delivering the liquid food product;
   a supportive wall associable with a capsule wall of the capsule for supporting the capsule wall during pressurization of the capsule with the liquid;
   an opening member disposed within the contour of the supportive wall and being configured for producing an opening in the capsule when the capsule is pressurized; and
   at least one elongated channel extending along the supportive wall and disposed downstream of the containment portion for receiving the liquid mixture and directing the liquid mixture to an outlet for providing the mixture as a liquid food;
   wherein the channel has a cross section configured to create shear stress in the flow of the liquid mixture sufficient to create foam in the liquid food.

34. The device of claim 33, wherein the supportive wall is resiliently moveable when biased by the pressurized capsule wall for extending the opening member therefrom to open the openable member.

35. The device of claim 33, wherein the supportive wall has a rounded contour for reducing localized stresses in the capsule wall.

36. The device of claim 33, wherein the supportive wall defines at least one channel extending away from the opening member for directing the flow of the mixture therefrom to the outlet.

37. The device of claim 33, wherein the extraction chamber is configured for positioning the capsule spaced from the opening member by a space sufficient to allow a sufficient pressure build up within the capsule to substantially mix the liquid and food ingredient, wherein the space is sufficiently small such that the pressurized capsule will extend against the opening member for opening the openable member.

* * * * *

UNITED STATES PATENT AND TRADEMARK OFFICE
CERTIFICATE OF CORRECTION

PATENT NO.     : 6,832,542 B2
DATED          : December 21, 2004
INVENTOR(S)    : Hu et al.

It is certified that error appears in the above-identified patent and that said Letters Patent is hereby corrected as shown below:

Column 23,
Line 41, after "along the boundary wall that is at least", insert -- one-fifth --.

Signed and Sealed this

First Day of March, 2005

JON W. DUDAS
*Director of the United States Patent and Trademark Office*